(12) United States Patent
Iwasaki et al.

(10) Patent No.: US 10,840,549 B2
(45) Date of Patent: Nov. 17, 2020

(54) SECONDARY BATTERY, BATTERY PACK, AND VEHICLE

(71) Applicant: Kabushiki Kaisha Toshiba, Minato-ku (JP)

(72) Inventors: Takuya Iwasaki, Uenohara (JP); Norio Takami, Yokohama (JP); Yasuhiro Harada, Isehara (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 83 days.

(21) Appl. No.: 16/119,447

(22) Filed: Aug. 31, 2018

(65) Prior Publication Data

US 2019/0296394 A1    Sep. 26, 2019

(30) Foreign Application Priority Data

Mar. 22, 2018 (JP) .................................. 2018-054811

(51) Int. Cl.
| | |
|---|---|
| *H01M 10/0565* | (2010.01) |
| *H01M 2/10* | (2006.01) |
| *H01M 4/13* | (2010.01) |
| *H01M 4/36* | (2006.01) |
| *H01M 10/42* | (2006.01) |

(Continued)

(52) U.S. Cl.
CPC ..... *H01M 10/0565* (2013.01); *H01M 2/1016* (2013.01); *H01M 4/13* (2013.01); *H01M 4/362* (2013.01); *H01M 10/052* (2013.01); *H01M 10/056* (2013.01); *H01M 10/4207* (2013.01); *H01M 10/625* (2015.04); *H01M 10/0564* (2013.01)

(58) Field of Classification Search
CPC .......... H01M 10/0565; H01M 2/1606; H01M 2/1613; H01M 2/1626; H01M 2/1633; H01M 4/00; H01M 4/022; H01M 4/021
See application file for complete search history.

(56) References Cited

U.S. PATENT DOCUMENTS

| | | |
|---|---|---|
| 2005/0053840 A1 | 3/2005 | Jo et al. |
| 2011/0281150 A1 | 11/2011 | Yong et al. |

(Continued)

FOREIGN PATENT DOCUMENTS

| | | |
|---|---|---|
| JP | 2006-185654 | 7/2006 |
| JP | 2008-226463 | 9/2008 |

(Continued)

OTHER PUBLICATIONS

Extended European Search Report dated Feb. 1, 2019 in U.S. Appl. No. 18191441.7, 9 pages.

(Continued)

*Primary Examiner* — Matthew J Merkling
(74) *Attorney, Agent, or Firm* — Oblon, McClelland, Maier & Neustadt, L.L.P.

(57) ABSTRACT

A secondary battery includes a positive electrode, a negative electrode arranged opposite to the positive electrode, a composite electrolyte interposed between the positive electrode and the negative electrode, the composite electrolyte containing an organic electrolyte and at least one of inorganic compound particles and organic compound particles; and a fibrous substance existed in both of the composite electrolyte and at least one of the positive electrode and the negative electrode.

15 Claims, 7 Drawing Sheets

(51) Int. Cl.
*H01M 10/625* (2014.01)
*H01M 10/052* (2010.01)
*H01M 10/056* (2010.01)
*H01M 10/0564* (2010.01)

(56) References Cited

U.S. PATENT DOCUMENTS

| | | | |
|---|---|---|---|
| 2012/0003524 A1* | 1/2012 | Jo | B01D 67/0013 |
| | | | 429/144 |
| 2012/0003545 A1* | 1/2012 | Lee | C23C 18/1212 |
| | | | 429/246 |
| 2013/0034770 A1* | 2/2013 | Kaun | H01M 2/145 |
| | | | 429/149 |
| 2014/0248537 A1 | 9/2014 | Hayashi et al. | |
| 2014/0255780 A1 | 9/2014 | Mikhaylik et al. | |
| 2018/0294513 A1 | 10/2018 | Hwang et al. | |

FOREIGN PATENT DOCUMENTS

| | | |
|---|---|---|
| JP | 2014-26819 | 2/2014 |
| JP | 2016-513860 | 5/2016 |
| JP | 6017432 | 11/2016 |
| JP | 2017-130451 | 7/2017 |
| WO | WO 2016/199805 | 12/2016 |
| WO | WO 2016/199805 A1 | 12/2016 |
| WO | WO 2017/179848 A1 | 10/2017 |

OTHER PUBLICATIONS

Liang, S. et al. "Gel polymer electrolytes for lithium ion batteries: Fabrication, characterization and performance" Solid State Ionics, vol. 318, XP085364456, 2017, pp. 2-18.

Office Action dated Sep. 11, 2020, in corresponding Japanese Patent Application No. 2018-054811.

* cited by examiner

SECONDARY BATTERY, BATTERY PACK, AND VEHICLE

CROSS-REFERENCE TO RELATED APPLICATIONS

This application is based upon and claims the benefit of priority from the prior Japanese Patent Application No. 2018-054811, filed on Mar. 22, 2018, the entire contents of which are incorporated herein by reference

TECHNICAL FIELD

Embodiments of the present invention relate to a secondary battery, a battery pack, and a vehicle.

BACKGROUND

A non-aqueous electrolyte battery using a lithium metal, a lithium alloy, a lithium compound, or a carbonaceous substance in a negative electrode, has been expected as a high energy density battery, and research and development thereof have actively progressed. Up to now, a lithium ion battery including a positive electrode containing $LiCoO_2$, $LiNi_{1/3}Co_{1/3}Mn_{1/3}O_2$, or $LiMn_2O_4$ as an active material, and a negative electrode containing a carbonaceous substance storing and releasing lithium, has been widely put to practical use. In addition, in the negative electrode, a metal oxide or an alloy has been considered instead of the carbonaceous substance. In particular, a material having excellent chemical and electrochemical stability, an excellent strength, and excellent corrosion resistance is required for a constituent material of the negative electrode, from the viewpoint of cycle life, long-term reliability of high output, and safety under an environment of a high temperature, in the case of being mounted on a vehicle such as an automobile. Further, high performance in a cold region is also required, and high output performance and long life performance under an environment of a low temperature are required.

SUMMARY

An object of the invention is to provide a secondary battery having excellent cycle life, a battery pack including the secondary battery, and a vehicle including the battery pack.

A secondary battery of an embodiment includes a positive electrode, a negative electrode arranged opposite to the positive electrode, a composite electrolyte interposed between the positive electrode and the negative electrode, the composite electrolyte containing an organic electrolyte and at least one of inorganic compound particles and organic compound particles and a fibrous substance existed in both of the composite electrolyte and at least one of the positive electrode and the negative electrode.

DETAILED DESCRIPTION

Figure 1:
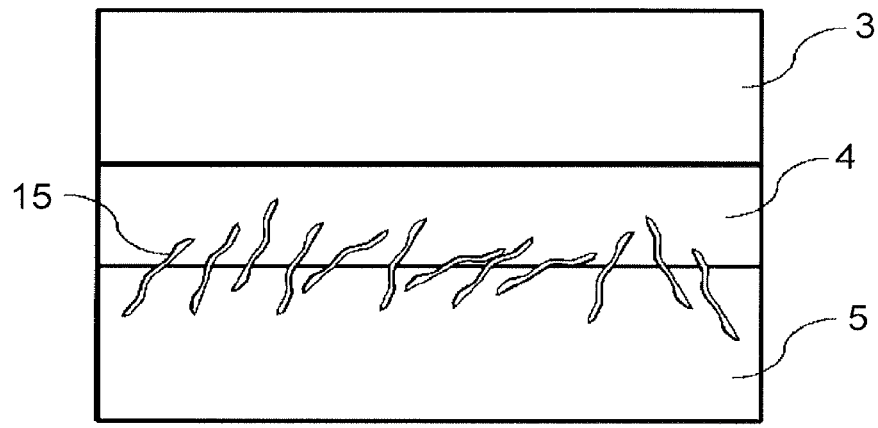
FIG. 1 is a sectional view schematically illustrating a state of a fibrous substance in a secondary battery according to a first embodiment.

Hereinafter, embodiments will be described with reference to the drawings. Furthermore, in the embodiments, the same reference numerals will be applied to the common configurations, and the repeated description will be omitted.

In addition, each of the drawings is a schematic view for describing the embodiments and promoting the understanding thereof, but the shape, the dimension, the ratio, or the like may be different from the actual device, and design change can be suitably performed with reference to the following description and the known technology.

First Embodiment

According to a first embodiment, a secondary battery is provided. The secondary battery includes a positive electrode, a negative electrode, a composite electrolyte which is interposed between the positive electrode and the negative electrode, and contains at least one of inorganic compound particles and organic compound particles, and an organic electrolyte, and a fibrous substance buried in both of at least one of the positive electrode and the negative electrode, and the composite electrolyte.

It is known that a non-aqueous electrolyte secondary battery causes a volume change in an electrode active material as being used, and thus, causes a failure in an electron conduction network. For this reason, a solid electrolyte, a non-volatile electrolytic solution, and a non-combustible electrolytic solution have been developed as a non-aqueous electrolyte, from the viewpoint of improving safe performance, but cause a decrease in discharge rate performance, low temperature performance, long life performance, and thus, have not been put to practical use yet. In particular, research and development for increasing ion conductance of an oxide solid electrolyte or a sulfide solid electrolyte have been progressed as the solid electrolyte, but interface resistance between the electrode and the solid electrolyte is large, and a decrease in discharge performance and low temperature performance is large. In addition, in a discharge and charge cycle test, the junction between the electrode and the solid electrolyte decreases, and thus, the interface resistance between the electrode and the solid electrolyte increases, and a decrease in the cycle life becomes remarkable. From such problems, it is difficult to put the secondary battery using the solid electrolyte to practical use.

The present inventors have conducted intensive studies in order to solve the problems described above, and as a result thereof, have found the secondary battery according to the first embodiment.

The secondary battery provided in this embodiment, includes the positive electrode, the negative electrode, the composite electrolyte which is interposed between the positive electrode and the negative electrode, and contains at least one of the inorganic compound particles and the organic compound particles, and the organic electrolyte, and the fibrous substance buried in both of at least one of the positive electrode and the negative electrode, and the composite electrolyte. The negative electrode is capable of including a negative electrode collector and a negative electrode active material layer. The composite electrolyte is an electrolyte containing at least one of inorganic compound particles and organic compound particles having lithium ion conductance, and an organic electrolyte. Furthermore, the inorganic compound particles and the organic compound particles will be described below. A cellulose nanofiber (CeNF) and an inorganic material can be used in the fibrous substance.

Figure 2:
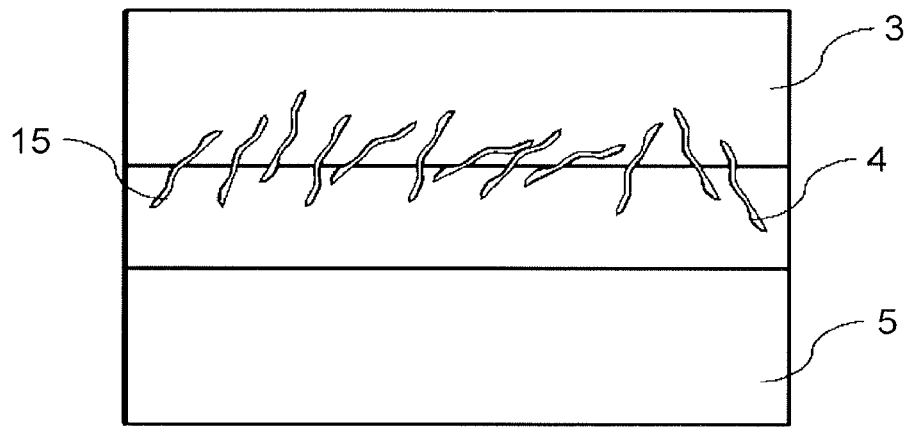
FIG. 2 is a sectional view schematically illustrating a state of another fibrous substance in the secondary battery according to the first embodiment.
Figure 3A:
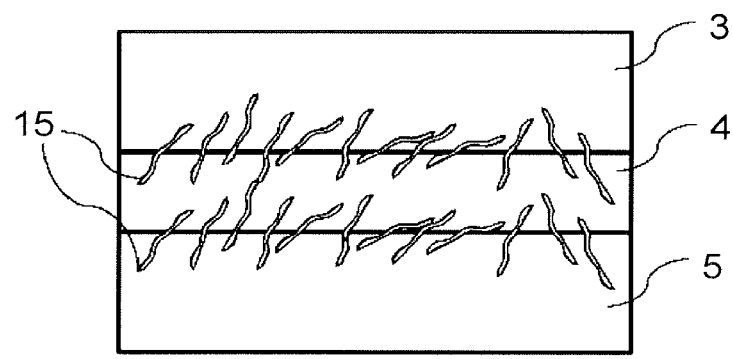
FIGS. 3A and 3B are sectional views schematically illustrating a state of another fibrous substance in the secondary battery according to the first embodiment.
Figure 3B:
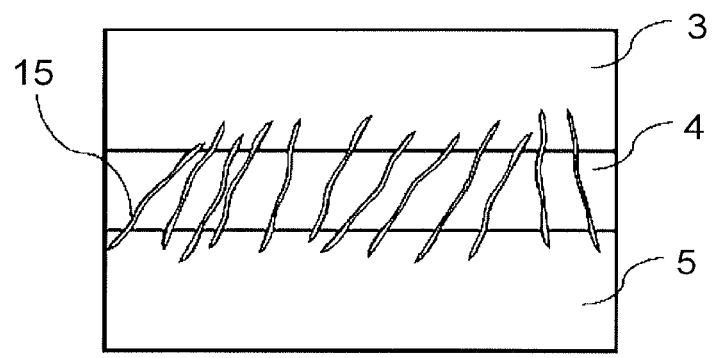

The secondary battery according to the first embodiment can be illustrated as with FIG. 1 FIG. 2, FIG. 3A and FIG. 3B. FIG. 1 is a sectional view illustrating a state in which a fibrous substance 15 is buried in both of a positive electrode 5 and a composite electrolyte 4. FIG. 2 is a sectional view illustrating a state in which the fibrous substance 15 is buried in both of a negative electrode 3 and the composite electrolyte 4. FIGS. 3A and 3B are sectional views illustrating a state in which the fibrous substance 15 is buried in all of the positive electrode 5, the negative electrode 3, and the composite electrolyte 4. The fibrous substance 15 is contained in the composite electrolyte 4, and thus, as illustrated in FIG. 1 FIG. 2, FIG. 3A and FIG. 3B, the fibrous substance 15 can be allowed to exist in both of at least one of the positive electrode 5 and the negative electrode 3, and the composite electrolyte 4. Specifically, the fibrous substance 15 is added at the time of preparing the composite electrolyte 4 described above. The composite electrolyte 4 to which the fibrous substance 15 is added, is applied onto an undried electrode, and is dried. Thus, the composite electrolyte 4 can be an electrolyte film. In a case where the composite electrolyte 4 is blown by using a spray nozzle at the time of the coating, the fibrous substance 15 is directed to stick the base at the time of passing through the spray nozzle, and thus, a part of the fibrous substance 15 enters the electrode at the time of being blown onto the undried electrode surface. A part of the fibrous substance 15 protrudes from a front surface of the positive electrode 5 by drying. In addition, in a case where the composite electrolyte 4 is applied onto the positive electrode 5 by using a brush or the like, the composite electrolyte 4 is applied by the brush or the like, and is dried, and then, the front surface is smoothed by using the brush, in a reverse direction from a direction in which the coating is performed by the brush or the like, and thus, a part of the fibrous substance 15 is capable of protruding from the front surface of the electrode.

After that, in order to form the electrolyte film, the composite electrolyte 4 is applied onto the electrode, and is dried, and thus, it is possible to obtain the fibrous substance 15 buried in both of the electrode and the composite electrolyte 4.

That is, the fibrous substance is in a state of being buried in both of the electrode and the composite electrolyte, and thus, it is possible to increase the junction between the electrode and the electrolyte film. In the secondary battery where the junction between the electrode and the electrolyte film increases, it is possible to suppress a volume change in the active material contained in the electrode, which occurs by repeating discharge and charge, and thus, it is possible to reduce and suppress shift or peeling of the interface between the electrode and the composite electrolyte film. For this reason, it is possible to suppress an increase in the interface resistance, and to considerably improve the cycle life. Hereinafter, enabling the shift or the peeling of the interface between the electrode and the composite electrolyte film to be reduced and suppressed will be referred to as an anchor effect.

In the composite electrolyte 4 for forming the electrolyte film, the fibrous substance 15 may be contained in at least one of the positive electrode 5 and the negative electrode 3, and it is not necessary that the fibrous substance 15 is contained in both of the composite electrolytes 4 to be applied onto the positive electrode 5 and the negative electrode 3.

In a case where the composite electrolyte 4 containing the fibrous substance 15 is used in both electrodes, as illustrated in FIG. 3A, the fibrous substance 15 can be allowed to exist in both of the positive electrode 5 and the negative electrode 3. In a case where the fibrous substance 15 is buried in both electrodes, it is possible to increase the anchor effect, compared to a case where the fibrous substance 15 is buried in the positive electrode 5 or the negative electrode 3 to be coated with the composite electrolyte 4 not containing the fibrous substance 15. In addition, the state where the fibrous substance 15 is buried in both electrodes, as illustrated in FIG. 3B, also includes a state where the fibrous substance 15 passes through the negative electrode 3, the composite electrolyte 4, and the positive electrode 5 at once. Similarly, in such a state, it is possible to increase the anchor effect.

Thus, the fibrous substance 15 is capable of linking the composite electrolyte 4 with the interface between the negative electrode 3 and the positive electrode 5, of linking the composite electrolyte 4 with the both electrodes in the state where the fibrous substance 15 passes through the composite electrolyte 4 and the both electrodes at once, and of linking the composite electrolyte 4 with the interface between the negative electrode 3 and the positive electrode 5 by being buried in each of the composite electrolyte 4 and the negative electrode 3, and the composite electrolyte 4 and the positive electrode 5, and by coupling the composite electrolyte 4 and the negative electrode 3, and the composite electrolyte 4 and the positive electrode 5 together before the composite electrolyte 4 is dried.

Next, a material of each member which can be included in the secondary battery according to the first embodiment will be described in detail.

(1) Composite Electrolyte

The composite electrolyte is an electrolyte containing inorganic compound particles and organic electrolyte, having lithium ion conductance, and a binding material. The composite electrolyte may be formed of inorganic compound particles, an organic electrolyte, and a binding material. The composite electrolyte may contain a fibrous substance.

In a case where a mixture of the organic electrolyte and the binding material, for example, is heated, a gel type electrolyte can be obtained. The composite electrolyte may contain a gel type composition containing the organic electrolyte and the binding material. In a case where the gel and the inorganic compound particles are compounded, a lithium ion conductance is improved, compared to a case where only a plurality of inorganic compound particles exist or a case where only the gel exists. It is considered that this is because the movement of the lithium ion between the inorganic compound particles is accelerated by the gel containing the organic electrolyte.

In a case where the lithium ion conductance of the inorganic compound particles increases, the lithium ion in the particles is also easily moved, and thus, the lithium ion conductance as the composite electrolyte further increases. A lithium ion conductivity of the inorganic compound particles contained in the composite electrolyte according to this embodiment, at 25° C., is greater than or equal to $1 \times 10^{-10}$ S/cm.

By using the inorganic compound particles of which the lithium ion conductance is greater than or equal to $1 \times 10^{-10}$ S/cm at a room temperature, it is possible to increase the lithium ion concentration on a contact interface at the time of being compounded with the organic electrolyte.

The lithium ion existing in the inorganic compound particles can be freely moved according to an external electrical field. For example, in a case where the inorganic compound particles and the gel are provided between the positive electrode and the negative electrode as a solid electrolyte, polarization occurs on the contact interface between the inorganic compound particles and the gel due to a potential difference between the positive electrode and the negative electrode. The lithium ions are collected on the front surface of the inorganic compound particles due to the polarization, and thus, a portion in which the concentration of the lithium ion is high, is generated in the particles. As a result thereof, it is considered that the movement of the lithium ion from a certain particle to the other particle is accelerated.

The inorganic compound particles, for example, contain at least one selected from the group consisting of sulfide-based $Li_2SeP_2S_5$-based glass ceramic, an inorganic compound having a perovskite type structure (for example, $Li_{0.5}La_{0.5}TiO_3$), an inorganic compound having an LiSICON type structure, LATP having an NASICON type skeleton ($Li_{1+x}Al_xTi_{2-x}(PO_4)_3$) ($0.1 \leq x \leq 0.4$) and $Li_{3.6}Si_{0.6}PO_4$, amorphous LIPON ($Li_{2.9}PO_{3.3}N_{0.46}$), and an inorganic compound having a garnet type structure. The inorganic compound used as the inorganic compound particles may be only one type of inorganic compound, or may be two or more types of inorganic compounds. The inorganic compound particles may be formed of a mixture of a plurality of types of inorganic compounds.

It is not preferable that the inorganic compound particles contain a sulfur element, since a sulfur component is dissolved in an organic electrolyte. It is preferable that the inorganic compound particles do not contain the sulfur element.

It is preferable that the inorganic compound particles are an oxide such as LATP having an NASICON type skeleton, amorphous LIPON, and garnet type $Li_7La_3Zr_2O_{12}$ (LLZ).

Among them, it is preferable that the inorganic compound particles are the inorganic compound having the garnet type structure. It is preferable that the inorganic compound particles are the inorganic compound having the garnet type structure, since a Li ion conductance and reduction resistance are high, and an electrochemical window is wide. Examples of the inorganic compound having the garnet type structure include $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_3O_{12}$, and LLZ. In the above description, x, for example, is $0 \leq x < 0.8$, and is preferably $0 \leq x \leq 0.5$. y, for example, is $0 \leq y < 2$. The inorganic compound having the garnet type structure may be formed of one type of the compound, or may contain a mixture of two or more types of the compounds. Among them, $Li_{6.25}Al_{0.25}La_3Zr_3O_{12}$ and LLZ have a high ion conductance, and are electrochemically stable, and thus, have excellent discharge performance and cycle life properties. Further, such compounds have advantages that the compounds are chemically stable with respect to the organic electrolyte described below even in the case of being atomized.

Here, in a case where an average particle diameter of the inorganic compound particles excessively increases, a gap between the particles tends to increase, and thus, it takes time to diffuse the lithium ions in the composite electrolyte, and rate performance, life performance, and life properties decrease. Therefore, the average particle diameter of the inorganic compound particles according to the embodiment is greater than or equal to 0.1 μm and less than 5 μm, and is greater than or equal to 0.1 μm and less than or equal to 5 μm. In a case where the average particle diameter of the inorganic compound particles is less than or equal to or less than 5 μm, it is possible to increase a diffusion rate of the lithium ions. It is preferable that the average particle diameter of the inorganic compound particles is greater than or equal to 0.1 μm and less than or equal to or less than 3 μm.

Dry type pulverization or wet type pulverization can be adopted as a pulverization method at the time of obtaining the inorganic compound particles by pulverization.

The average particle diameter of the inorganic compound particles can be measured by a scanning electron microscope (SEM). In addition, the average particle diameter of the inorganic compound particles can be measured by using a laser diffraction distribution measurement device (for example, Shimadzu SALD-300). First, the average particle diameter of the inorganic compound particles can be measured by a method in which approximately 0.1 g of a sample, a surfactant, and 1 mL to 2 mL of distilled water are added to a beaker, and are sufficiently stirred, and then, are injected into a stirring tank, a light intensity distribution is measured 64 times at 2 seconds intervals, and thus, grain size distribution data is analyzed. The method can also be used in the electrode active material described below.

The composite electrolyte may contain other particles of which a lithium ion conductivity is less than $1 \times 10^{-10}$ S/cm. It is preferable that the other particles of which the lithium ion conductivity is less than $1 \times 10^{-10}$ S/cm, for example, are at least one selected from the group consisting of aluminum oxide, zirconium oxide, silicon oxide, and magnesium oxide, from the viewpoint of high reducing properties and a low cost. In addition, even in a case where the other particles are a metal oxide such as titanium oxide, niobium oxide, tantalum oxide, hafnium oxide, yttrium oxide, gallium oxide, and germanium oxide, and a lanthanoid-based oxide such as lanthanum oxide, the same effect can be obtained. The other particles can be one type or two or more types selected from the compounds described above.

Not only the inorganic compound particles, but also organic compound particles obtained by pulverizing an organic compound according to the same method as the pulverization method of the inorganic compound particles described above, can be used in the composite electrolyte.

The inorganic compound particles and the organic compound particles can be used in the composite electrolyte by being mixed. The organic compound is prepared by solidifying the organic electrolyte described below.

The organic electrolyte contains an organic solvent and an electrolyte salt. An organic solvent in which the inorganic compound is hardly melted and which can be allowed to stably exist, is preferable as the organic solvent. For example, cyclic carbonate such as N-methyl-2-pyrrolidone (NMP), propylene carbonate (PC), ethylene carbonate (EC), andvinylene carbonate; chain-like carbonate such as diethyl carbonate (DEC), dimethyl carbonate (DMC), and methyl ethyl carbonate (MEC); cyclic ether such as tetrahydrofuran (THF), 2-methyl tetrahydrofuran (2MeTHF), and dioxolane (DOX); chain-like ether such as dimethoxy ethane (DME) and diethoethane (DEE); or γ-butyrolactone (GBL), acetonitrile (AN), sulfolane (SL), and the like can be used as the organic solvent. Such organic solvents can be independently used, or can be used in a state of a mixed solvent.

It is preferable that the electrolyte salt includes a lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethane sulfonate ($LiCF_3SO_3$), and lithium bistrifluoromethyl sulfonyl imide [$LiN(CF_3SO_2)_2$], or a mixture thereof. The organic electrolyte may further contain other electrolyte salts.

A ratio of the weight of the organic electrolyte to the weight of the composite electrolyte, for example, is in a range of 0.1 mass % to 20 mass %, and is preferably in a range of 1 mass % to 10 mass %. In a case where the ratio of the weight of the organic electrolyte to the weight of the composite electrolyte is in the range described above, a lithium ion conduction path for easily conducting the lithium ion to the front surface of the inorganic compound is formed, and an excellent interface can be formed between the composite electrolyte as a solid electrolyte and the active material, and thus, it is possible to obtain an effect of improving high temperature durability and the cycle life of the battery.

The composite electrolyte contains the binding material. The composite electrolyte may further contain other additives.

The binding material, for example, is a polymer which is gelated with an organic solvent such as carbonates. Examples of the binding material include styrene-butadiene rubber (SBR), polyacrylonitrile (PAN), polyethylene oxide (PEO), polyvinylidene fluoride (PVdF), and polymethyl methacrylate. Only one type of the binding materials described above may be independently used, or a plurality of types thereof may be used by being mixed.

A ratio of the weight of the binding material to the weight of the composite electrolyte, for example, is in a range of 0.1 weight % to 10 weight %, and is preferably in a range of 0.5 weight % to 5 weight %. In a case where the ratio of the weight of the binding material to the weight of the composite electrolyte excessively decreases, the viscosity of the gelated organic electrolyte is insufficient, and thus, it is not possible to retain the inorganic compound particles together, a mechanical strength of the composite electrolyte decreases, and the composite electrolyte tends to be peeled off from the electrode. In a case where the ratio excessively increases, the movement of the lithium ion is hindered, and diffusion resistance of the ion tends to increase.

It is not preferable that the ratio of the weight of the binding material to the weight of the composite electrolyte is less than 0.1 weight %, since binding properties of the fibrous substance decrease, and thus, the electrode easily expands at the time of being permeated by an electrolytic solution, and the electrode is easily chipped or peeled off. It is not preferable that the ratio of the weight of the binding material to the weight of the composite electrolyte is greater than 10 weight %, the binding material is entangled with the fibrous substance, and the fibrous substance exists in a state of being collected, and thus, the entire substance in which the fibrous substance is collected, becomes an insulating body, and electronically and ionically large resistance is generated.

The ratio of the weight of the binding material to the weight of the composite electrolyte, for example, is measured as follows.

In the case of the secondary battery using SBR as the binder, the secondary battery is discharged, and then, the battery is disassembled in an inert atmosphere (for example, a glove box filled with argon), the electrode is taken out, and the electrode is washed with diethyl carbonate. The electrode after being washed is cut out in an electrode short-side direction, twenty spots are selected in the cut-out sectional surface, at regular intervals from a position separated from an end by greater than or equal to 10%, the electrode is set in an ion milling device in the inert atmosphere, the sectional surface of the electrode is etched by an argon ion beam, and the sectional surface is cut to be 0.5 cm×0.5 cm. In twenty spots, ten spots are subjected to osmium oxide dyeing (Os dyeing) in order to observe SBR. Thus, ten samples adjusted as described above and ten samples which are not adjusted are observed by using SEM. At this time, field emission scanning electron microscopes (FE-SEM) manufactured by Hitachi High-Technologies Corporation and QUANTAX XFlash & FlatQUAD manufactured by Bruker AXS GmbH are used as a device.

SEM is performed at an acceleration voltage of 10 kV, and EDX for element mapping is performed at an acceleration voltage of 5 kV. Analysis is performed by an energy dispersive X-ray spectroscopy (EDX) in the inert atmosphere, a wavelength of a characteristic X-ray is read out, and thus, an element is identified, and a content is quantified from the strength of the characteristic X-ray.

An ion conductivity of the composite electrolyte, for example, is in a range of 0.1 mS/cm to 20 mS/cm, and is preferably in a range of 0.5 mS/cm to 10 mS/cm. The organic electrolyte contained in the composite electrolyte covers at least a part of the solid electrolyte, and is suitably gelated, and thus, it is possible to attain the ion conductivity described above. It is preferable that the ion conductivity is high, since the rate performance is improved.

CeNF or an inorganic material can be used as the fibrous substance. Only one type of fibrous substance may be used, or a plurality of types thereof may be simultaneously used. An alumina fiber, silica, Boehmite, and the like can be used as the inorganic material.

In order to mix the fibrous substance into the composite electrolyte, the following method is used.

For example, the fibrous substances are dispersed in a solvent such as N-methyl-2-pyrrolidone or pure water, and the inorganic compound particles having lithium ion conductance are added and dispersed, and finally, the binding material is added, and thus, slurry is obtained. At this time, the solvent to be used is not particularly limited, and a polar solvent, an apolar organic solvent, a non-polar organic solvent, a polar organic solvent, and the like can be used.

In addition, the composite electrolyte is gelated, and thus, it is possible to improve the anchor effect.

It is preferable that an average diameter of the fibrous substance is smaller than the diameter of the electrode active material. For this reason, it is preferable that the average diameter of the fibrous substance is 1 nm to 1000 nm. It is preferable that the average diameter is large, since the anchor effect can be exhibited, but it is not preferable that the average diameter is excessively large, since insulating resistance increases. For this reason, a more preferred range is greater than or equal to 10 nm and less than or equal to 100 nm.

The fibrous substance contained in the composite electrolyte can be specified by the following method.

Measurement is performed by using SEM-EDX according to the same method as that used for measuring the ratio of the weight of the binding material to the weight of the composite electrolyte described above. The fibrous substance is specified by an element mapping image obtained as described above, and an SEM image.

In the average diameter of the fibrous substance contained in the composite electrolyte, a sample is adjusted by the same method as that used for measuring the ratio of the weight of the binding material to the weight of the composite electrolyte, and the average diameter of the fibrous substance can be measured by using a length measurement function of SEM.

It is preferable that the fibrous substance contained in the composite electrolyte is greater than or equal to 0.1 weight % and less than or equal to 99 weight %. According to such a range, it is possible to increase the strength even in a case where the thickness of the electrolyte film is less than or equal to 10 μm, and thus, it is possible to considerably reduce internal short-circuit and self-discharge. It is not preferable that the fibrous substance contained in the composite electrolyte is less than 0.1 weight %, since it is not possible to suppress the shift of the interface between the electrode and the composite electrolyte, and it is not preferable that the fibrous substance contained in the composite electrolyte is greater than 99 weight %, since the insulating resistance increases. It is more preferable that the fibrous substance contained in the composite electrolyte is in a range of greater than or equal to 1 weight % and less than or equal to 5 weight %. According to such a range, it is possible to homogeneously distribute the fibrous substances in the composite electrolyte, and thus, it is possible to further improve the anchor effect.

A measurement method of weight % of the fibrous substance contained in the composite electrolyte is as follows.

As with a measurement method of the ratio of the weight of the binding material to the weight of the composite electrolyte, identification of a substance contained in the composite electrolyte, and an area ratio are obtained from the electrode sectional surface etching using the argon ion beam, the element mapping using EDX, and the shape of the fibrous substance. Further, in the electrode sectional surface etching using the argon ion beam, a surface is cut out to be approximately 1 um. In the cut-out surface, similarly, the identification of the substance contained in the composite electrolyte, and the calculation of the area ratio are performed with respect to each substance contained in the composite electrolyte, from the element mapping using EDX, and the shape of the fibrous substance. The measurement is repeated, and thus, the identification of the contained substance and the area ratio can be obtained, even in a depth direction (a center direction of the electrode). Weight % of the fibrous substance is calculated from ratio data, and specific weight of each identified substance.

Furthermore, in a case where the composite electrolyte is used as the electrolyte film, an aqueous electrolyte may be injected into the secondary battery.

(2) Positive Electrode

The positive electrode is capable of including a positive electrode collector and a positive electrode active material layer. The positive electrode active material layer can be formed on one surface or both surfaces of the positive electrode collector. The positive electrode active material layer is capable of containing a positive electrode active material, and arbitrarily, a conductive agent and a binder.

It is preferable that an aluminum foil or an aluminum alloy foil having a purity of greater than or equal to 99% is used as the positive electrode collector. An alloy containing one or more types of elements selected from the group consisting of iron, magnesium, zinc, manganese, and silicon, is preferable as the aluminum alloy, other than aluminum. For example, an Al—Fe alloy, an Al—Mn-based alloy, and an Al—Mg-based alloy are capable of obtaining a higher strength than aluminum.

It is preferable that a content of a transition metal such as aluminum, nickel in an aluminum alloy, and chromium, is less than or equal to 100 ppm (including 0 ppm). For example, in the case of using an Al—Cu-based alloy, the strength is high, but corrosion resistance is degraded, and thus, the Al—Cu-based alloy is not suitable as the current collector.

It is more preferable that the aluminum purity is in a range of 99.0 to 99.99%. By setting the aluminum purity to be in the range described above, it is possible to reduce a decrease in the cycle life due to an increase in the temperature of the electrolyte according to the dissolution of an impurity element contained in the positive electrode collector.

Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, olivine type lithium iron phosphate (LiFePO$_4$), and lithium manganese phosphate (LiMnPO$_4$).

Examples of the positive electrode active material include a lithium manganese composite oxide such as Li$_x$Mn$_2$O$_4$ or Li$_x$MnO$_2$, a lithium nickel aluminum composite oxide such as Li$_x$Ni$_{1-y}$Al$_y$O$_2$, a lithium cobalt composite oxide such as Li$_x$CoO$_2$, a lithium nickel cobalt composite oxide such as Li$_x$Ni$_{1-y-z}$Co$_y$Mn$_z$O$_2$, a lithium manganese cobalt composite oxide such as Li$_x$Mn$_y$Co$_{1-y}$O$_2$, a spinel type lithium manganese nickel composite oxide such as Li$_x$Mn$_{2-y}$Ni$_y$O$_4$, a lithium phosphorus oxide having an olivine structure, such as Li$_x$FePO$_4$, Li$_x$Fe$_{1-y}$Mn$_y$PO$_4$, and Li$_x$CoPO$_4$, and fluorinated iron sulfate Li$_x$FeSO$_4$F. x satisfies 0<x≤1, unless otherwise noted. y satisfies 0<y<1, unless otherwise noted.

Such positive electrode active materials are preferable since a high positive electrode potential can be obtained. Among them, a lithium nickel aluminum composite oxide, a lithium nickel cobalt manganese composite oxide, and a lithium manganese cobalt composite oxide are capable of suppressing a reaction with the electrolyte under a high temperature environment, and are capable of considerably improving the battery life. In particular, a lithium nickel cobalt manganese composite oxide represented by Li$_x$N$_{1-y-z}$Co$_y$Mn$_z$O$_2$ (0<x≤-1, 0<y<0.5, and 0<z<0.5) is preferable. By using the lithium nickel cobalt manganese composite oxide, it is possible to further increase durability in a high temperature environment.

Examples of the conductive agent for increasing electron conductivity and for suppressing contact resistance with the current collector are capable of including acetylene black, carbon black, graphite, and the like.

Examples of the binder for binding the active material and the conductive agent together include polytetrafluoroethylene (PTFE), polyvinylidene fluoride (PVdF), fluorine-based rubber, and the like.

In a blending ratio of the positive electrode active material, the conductive agent, and the binder in the positive electrode active material layer, it is preferable that the positive electrode active material is in a range of greater than or equal to 80 weight % and less than or equal to 95 weight %, the conductive agent is in a range of greater than or equal to 3 weight % and less than or equal to 18 weight %, and the binder is in a range of greater than or equal to 2 weight % and less than or equal to 7 weight %. In a case where the conductive agent is greater than or equal to 3 weight %, it is possible to exhibit the effect described above, and in a case where the conductive agent is less than or equal to 18 weight %, it is possible to reduce the decomposition of the electrolyte on a front surface of the conductive agent under high temperature preservation. In a case where the binder is greater than or equal to 2 weight %, it is possible to obtain a sufficient electrode strength, and in a case where the binder is less than or equal to 7 weight %, it is possible to reduce an insulating portion of the electrode.

The positive electrode, for example, can be prepared by the following method. First, the positive electrode active material, the conductive agent, and the binder are suspended in a solvent, and thus, slurry is prepared. The slurry is applied onto one surface or both surfaces of the positive electrode collector. Next, the applied slurry is dried, and thus, a laminated body of the positive electrode active material layer and the positive electrode collector is obtained. After that, the laminated body is pressed. It is preferable that a positive electrode pressing pressure is in a range of 0.15 ton/mm to 0.3 ton/mm. It is preferable that the positive electrode pressing pressure is in the range described above, since adhesiveness (a peeling strength) between the positive electrode active material layer and the positive electrode collector increases, and an extension rate of the positive electrode collector is less than or equal to 20%. Accordingly, the positive electrode is prepared. Alternatively, the positive electrode may be prepared by the following method. First, the positive electrode active material, the conductive agent, and the binder are mixed with each other, and thus, a mixture is obtained. Next, the mixture is molded into the shape of a pellet. Next, the pellet is disposed on the positive electrode collector, and thus, the positive electrode can be obtained.

(3) Negative Electrode

The negative electrode is capable of including negative electrode collector and a negative electrode active material layer. The negative electrode active material layer can be formed on one surface or both surfaces of the negative electrode collector. The negative electrode active material layer is capable of containing a negative electrode active material, and arbitrarily, a conductive agent and a binder.

A material which is electrochemically stable at the storage and releasing potential of lithium of the negative electrode active material, is used in the negative electrode collector. It is preferable that the negative electrode collector is formed of an aluminum alloy containing one or more elements selected from copper, nickel, stainless steel, or aluminum, or Mg, Ti, Zn, Mn, Fe, Cu, and Si. It is preferable that the thickness of the negative electrode collector is in a range of greater than or equal to 5 μm and less than or equal to 20 μm. The negative electrode collector having such a thickness is capable of being balanced between the strength and weight saving of the negative electrode.

The negative electrode active material, for example, is included in the negative electrode in the shape of particles. Negative electrode active material particles may be single primary particles, secondary particles which are an aggregate of the primary particles, or a mixture of the single primary particles and the secondary particles. It is preferable that the negative electrode active material layer contains 5 volume % to 50 volume % of primary particles, from the viewpoint of a high density. The shape of the primary particles is not particularly limited, but for example, the primary particles can be in the shape of a sphere, an ellipse, a flat, a fiber, and the like.

Examples of the negative electrode active material include a carbon material, a graphite material, a lithium alloy material, a metal oxide, and a metal sulfide, and among them, it is preferable to select a negative electrode active material containing one or more types of titanium-containing oxides selected from a lithium titanium oxide, a titanium oxide, a niobium titanium oxide, and a lithium sodium niobium titanium oxide, of a storage and releasing potential of the lithium ion is in a range of 1 V to 3 V on the basis of a lithium potential.

A lithium titanium oxide is a spinel structure lithium titanium oxide represented by General Formula $Li_{4+x}TiO_{12}$ (x is $-1 \leq x \leq 3$), and a ramsdellite structure lithium titanium oxide is a lithium titanium oxide such as $Li_{2+x}Ti_3O_7$, $Li_{1+x}Ti_2O_4$, $Li_{1.1+x}Ti_{1.8}O_4$, $Li_{1.07+x}Ti_{1.86}O_4$, and $Li_xTiO_2$ (x is $0 \leq x$), and a titanium oxide of a monoclinic crystal structure represented by General Formula $Li_xTiO_2$ ($0 \leq x$) ($TiO_2(B)$ as a structure before charge), and a rutile structure and an anatase structure ($TiO_2$ as a structure before charge, and a niobium titanium oxide is $Li_aTiM_bNb_{2\pm\beta}O_{7\pm\sigma}$ ($0 \leq a \leq 5$, $0 \leq b \leq 0.3$, $0 \leq \beta \leq 0.3$, and $0 \leq \sigma \leq 0.3$, M is at least one type of element selected from the group consisting of Fe, V, Mo, and Ta). Such titanium-containing oxides can be independently used, or can be used by being mixed.

A spinel structure lithium titanium oxide represented by General Formula $Li_{4+x}Ti_5O_{12}$ (x is $-1 \leq x \leq 3$), in which a volume change is extremely small, is preferable. By using such a titanium-containing oxide, it is possible to use an aluminum foil in the negative electrode collector instead of a copper foil, and to realize weight saving and a low cost. In addition, it is advantageous for an electrode structure of a bipolar structure.

It is preferable that an average particle diameter of the negative electrode active material particles is less than or equal to 1 μm, and a specific surface area in a BET method according to $N_2$ adsorption is in a range of 3 $m^2/g$ to 200 $m^2/g$. Accordingly, it is possible to increase affinity between the negative electrode and the electrolyte.

The reason for defining the specific surface area of the negative electrode to be in the range described above will be described. In a case where the specific surface area is less than 3 $m^2/g$, the aggregate of the particles is noticeable, and thus, the affinity between the negative electrode and the electrolyte decreases, and interface resistance of the negative electrode increases. As a result thereof, output properties and discharge and charge cycle properties decrease. On the other hand, in a case where the specific surface area is greater than 50 $m^2/g$, the distribution of the electrolyte is biased to the negative electrode, and there is a possibility that the electrolyte is insufficient in the positive electrode, and thus, the output properties and the discharge and charge cycle properties are not improved. A more preferred range of the specific surface area is 5 m$^2$/g to 50 m$^2$/g. Here, the specific surface area of the negative electrode indicates a surface area per 1 g of the negative electrode active material layer (excluding the weight of the current collector). Furthermore, the negative electrode active material layer is a porous layer containing the negative electrode active material, the conductive agent, and the binder, supported on the current collector.

It is preferable that a porosity of the negative electrode (excluding the current collector) is in a range of 20% to 50%. Accordingly, it is possible to obtain a negative electrode having excellent affinity between the negative electrode and the electrolyte and a high density. A more preferred range of the porosity is 25% to 40%.

For example, a carbon material can be used as the conductive agent. Examples of the carbon material are capable of including acetylene black, carbon black, coke, a carbon fiber, graphite, an aluminum powder, TiO, and the like. A powder of coke, graphite, and TiO, of which a heat treatment temperature is 800° C. to 2000° C. and an average particle diameter is less than or equal to 10 μm, and a carbon fiber of which an average fiber diameter is less than or equal to 1 μm are more preferable. It is preferable that a BET specific surface area according to the N2 adsorption of the carbon material is greater than or equal to 10 m$^2$/g.

Examples of the binder include polytetrafluoroethylene (PTFE), polyvinylidene fluoride (PVdF), fluorine-based rubber, styrene butadiene rubber, a core-shell binding material, and the like.

In a blending ratio of the active material, the conductive agent, and the binder in the negative electrode, it is preferable that the negative electrode active material is in a range of 80 weight % to 95 weight %, the conductive agent is in a range of 3 weight % to 18 weight %, and the binder is in a range of 2 weight % to 7 weight %.

The negative electrode, for example, can be prepared by the following method. First, the negative electrode active material, the conductive agent, and the binder are suspended in a suitable solvent, and thus, slurry is prepared. Next, the slurry is applied onto one surface or both surfaces of the negative electrode collector. The coated film on the negative electrode collector is dried, and thus, the negative electrode active material layer is formed. After that, the negative electrode collector and the negative electrode active material layer formed thereon are pressed. The negative electrode active material, the conductive agent, and the binder may be formed into the shape of a pellet, and may be used as the negative electrode active material layer.

(4) Electrolyte Film

The composite electrolyte according to the first embodiment can be used as the electrolyte film. In addition, when the composite electrolyte according to the first embodiment is used as the electrolyte film, a known separator may be interposed therebetween, in order to improve insulating properties of the electrolyte film. The known separator is interposed by applying the composite electrolyte onto the electrode, and then, by disposing the known separator on the composite electrolyte, and by directly disposing the electrode or by further disposing the composite electrolyte thereon.

For example, a porous film formed of a material such as polyethylene (PE), polypropylene (PP), polyethylene terephthalate (PET), cellulose, and polyvinylidene fluoride (PVdF), a non-woven fabric formed of a synthetic resin, and the like can be used as the known separator to be interposed. Further, an electrolyte film in which an inorganic compound is applied onto a porous film, can also be used. A preferred porous film is formed of polyethylene or polypropylene, is melted at a constant temperature, and is capable of blocking a current, and thus, is possible to improve safety. A plate-like inorganic compound or organic compound may be used.

(5) Exterior Member

For example, a vessel formed of a laminate film, or a metal vessel can be used as the exterior member.

The thickness of the laminate film, for example, is less than or equal to 0.5 mm, and is preferably less than or equal to 0.2 mm.

A multi-layered film including a plurality of resin layers, and a metal layer interposed between the resin layers, is used as the laminate film. The resin layer, for example, contains polymer material such as polypropylene (PP), polyethylene (PE), nylon, and polyethylene terephthalate (PET). It is preferable that the metal layer is formed of an aluminum foil or an aluminum alloy foil, in order for weight saving. The laminate film is sealed by thermal fusion bonding, and thus, can be molded into the shape of an exterior member.

The thickness of the wall of the metal vessel, for example, is less than or equal to 1 mm, is more preferably less than or equal to 0.5 mm, and is even more preferably less than or equal to 0.2 mm.

The metal vessel, for example, can be formed of aluminum, an aluminum alloy, or the like. It is preferable that the aluminum alloy contains an element such as magnesium, zinc, and silicon. In a case where the aluminum alloy contains a transition metal such as iron, copper, nickel, and chromium, it is preferable that the content of the transition metal is less than or equal to 100 ppm.

The shape of the exterior member is not particularly limited. The exterior member, for example, may be in the shape of a flat (thin type), a square, a cylinder, a coin, a button, or the like. The exterior member, for example, may be an exterior member for a small battery, which is mounted on a portable electronic device or the like, or an exterior member for a large battery, which is mounted on a vehicle such as two-wheel to four-wheel automobiles, and a rail transport vehicle, according to a battery dimension.

(6) Negative Electrode Terminal

The negative electrode terminal can be electrochemically stable at a Li storage and releasing potential of the negative electrode active material described above, and can be formed of a material having conductivity. Specifically, examples of the material of the negative electrode terminal include an aluminum alloy containing at least one type of elements selected from the group consisting of copper, nickel, stainless steel or aluminum, or Mg, Ti, Zn, Mn, Fe, Cu, and Si. It is preferable that aluminum or an aluminum alloy is used as the material of the negative electrode terminal. It is preferable that the negative electrode terminal is formed of the same material as that of the negative electrode collector, in order to reduce contact resistance with the negative electrode collector.

(7) Positive Electrode Terminal

The positive electrode terminal is electrically stable in a range where the potential of lithium with respect to an oxidation-reduction potential is greater than or equal to 3.0 V and less than or equal to 4.5 V (vs. Li/Li$^-$), and is formed of a material having conductivity. Examples of the material of the positive electrode terminal include an aluminum alloy containing at least one type of an elements selected from the group consisting of aluminum, or Mg, Ti, Zn, Mn, Fe, Cu, and Si. It is preferable that the positive electrode terminal is formed of the same material as that of the positive electrode collector, in order to reduce contact resistance with the positive electrode collector.

The secondary battery is provided as the first embodiment. The secondary battery includes the positive electrode, the negative electrode, the composite electrolyte containing inorganic compound particles and the organic electrolyte, and the fibrous substance linking at least one of the positive electrode and the negative electrode with at least a part of the composite electrolyte. In such a secondary battery, the junction between the electrode and the electrolyte film increases, and the interface resistance between the electrode and the electrolyte film can be reduced, and thus, it is possible to have excellent life properties.

Next, the secondary battery according to the first embodiment will be described in more detail, with reference to the drawings.

Figure 4:
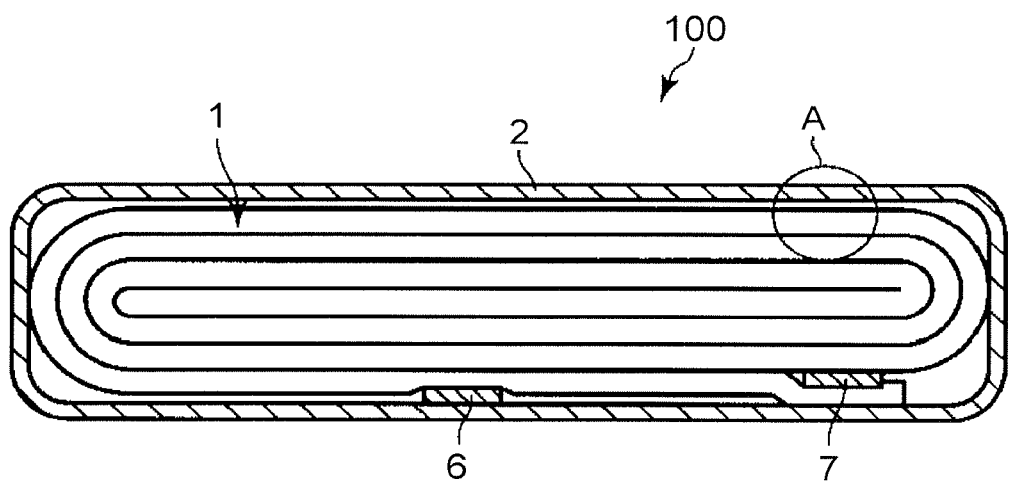
FIG. 4 is a sectional view schematically illustrating an example of the secondary battery according to the first embodiment.
Figure 5:
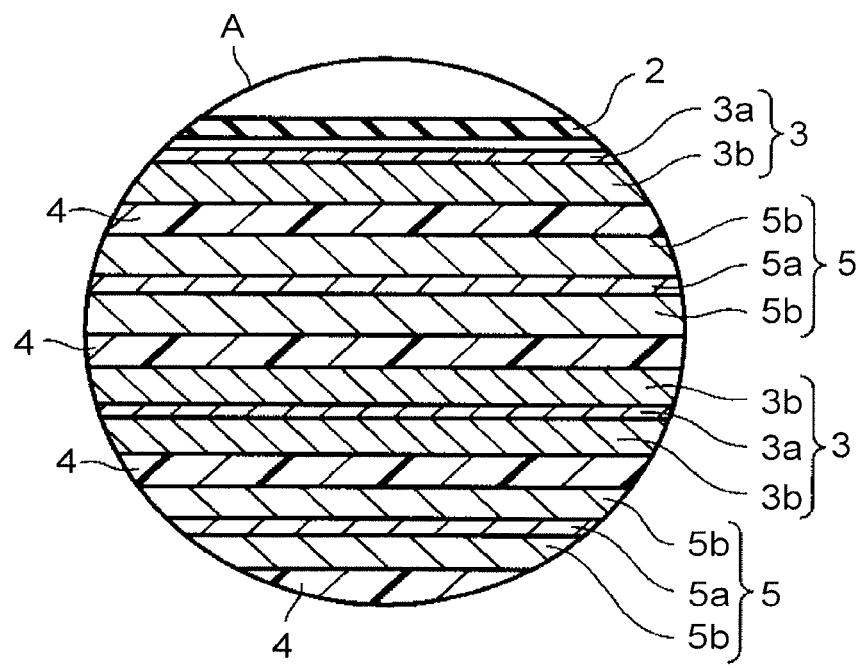
FIG. 5 is an enlarged sectional view of a portion A of FIG. 4.

FIG. 4 is a sectional view schematically illustrating an example of the secondary battery according to the first embodiment. FIG. 5 is an enlarged sectional view of a portion A of the secondary battery illustrated in FIG. 4.

A secondary battery 100 illustrated in FIG. 4 and FIG. 5 includes a pouched exterior member 2 illustrated in FIG. 4, and an electrode group 1 illustrated in FIG. 4 and FIG. 5. The secondary battery 100 may further include a non-aqueous electrolyte. The electrode group 1 is contained in an exterior member 2. In a case where the secondary battery 100 includes the non-aqueous electrolyte, the non-aqueous electrolyte is retained in the electrode group 1.

The pouched exterior member 2 is formed of a laminate film includes two resin layers, and a metal layer interposed between the resin layers.

As illustrated in FIG. 4, the electrode group 1 is a flat wound electrode group. As illustrated in FIG. 5, the flat wound electrode group 1 includes a negative electrode 3, an electrolyte film 4, and a positive electrode 5. The electrolyte film 4 is interposed between the negative electrode 3 and the positive electrode 5.

The negative electrode 3 includes a negative electrode collector 3a and a negative electrode active material layer 3b. As illustrated in FIG. 5, in a portion of the negative electrode 3, which is positioned on the outermost shell of the wound electrode group 1, the negative electrode active material layer 3b is formed only on the inner surface side of the negative electrode collector 3a. In the other portion of the negative electrode 3, the negative electrode active material layer 3b is formed on both surfaces of the negative electrode collector 3a.

The positive electrode 5 includes a positive electrode collector 5a, and a positive electrode active material layer 5b formed on both surfaces of the positive electrode collector 5a.

As illustrated in FIG. 4, a negative electrode terminal 6 and a positive electrode terminal 7 are positioned in the vicinity of an outer circumferential end of the wound electrode group 1. The negative electrode terminal 6 is connected to a part of the negative electrode collector 3a of the negative electrode 3, which is positioned on the outermost shell. In addition, the positive electrode terminal 7 is connected to the positive electrode collector 5a of the positive electrode 5, which is positioned on the outermost shell. The negative electrode terminal 6 and the positive electrode terminal 7 extend to the outside from an opening portion of the pouched exterior member 2.

The opening portion of the pouched exterior member 2 is heat-sealed by being interposed between the negative electrode terminal 6 and the positive electrode terminal 7, and thus, the wound electrode group 1 is sealed.

Figure 6:
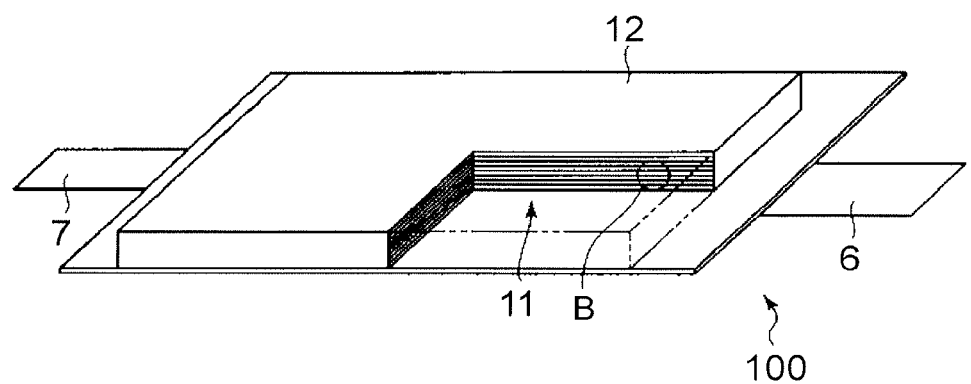
FIG. 6 is a partially cut-out perspective view schematically illustrating another example of the secondary battery according to the first embodiment.
Figure 7:
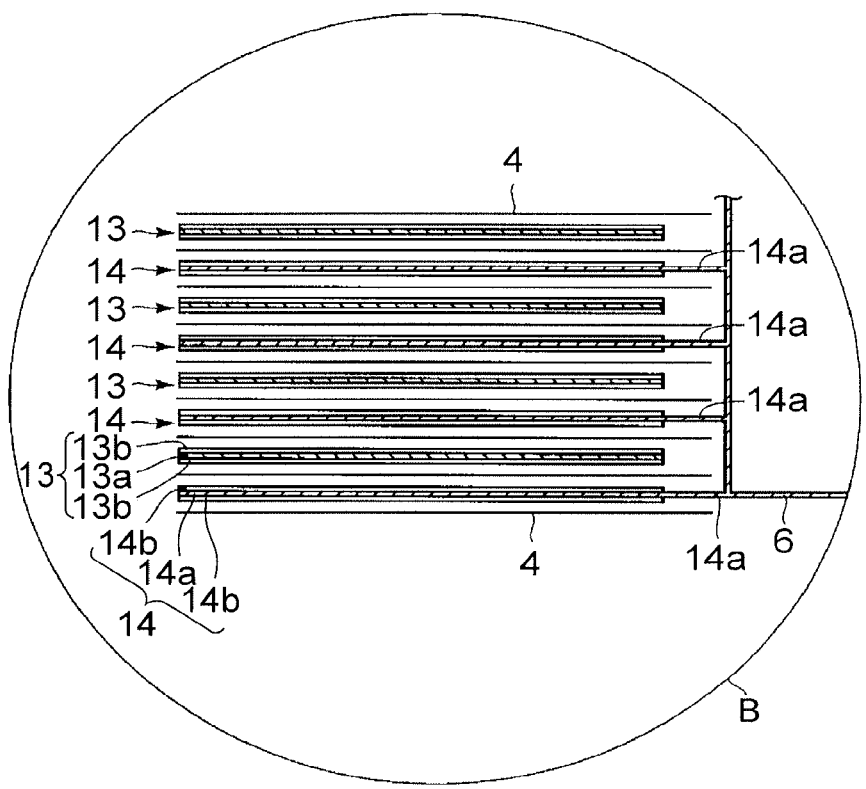
FIG. 7 is an enlarged sectional view of a portion B of FIG. 6.

The secondary battery according to this embodiment is not limited to the secondary battery having the configuration illustrated in FIG. 4 and FIG. 5, and for example, may by a battery having a configuration illustrated in FIG. 6 and FIG. 7. FIG. 6 is a partially cut-out perspective view schematically illustrating another example of the secondary battery according to the first embodiment. FIG. 7 is an enlarged sectional view of a portion B of the secondary battery illustrated in FIG. 6.

The secondary battery 100 illustrated in FIG. 6 and FIG. 7 includes an electrode group 11 illustrated in FIG. 6 and FIG. 7, and an exterior member 12 illustrated in FIG. 6. The secondary battery 100 may include a non-aqueous electrolyte. The electrode group 11 is contained in the exterior member 12. In a case where the secondary battery 100 includes the non-aqueous electrolyte, the non-aqueous electrolyte is retained in the electrode group 11.

The exterior member 12 is formed of a laminate film including two resin layers, and a metal layer interposed between the resin layers.

As illustrated in FIG. 7, the electrode group 11 is a laminated electrode group. The laminated electrode group 11 has a structure in which the positive electrode 13 and the negative electrode 14 are alternately laminated while interposing a composite electrolyte 15 between the positive electrode 13 and the negative electrode 14.

The electrode group 11 includes a plurality of positive electrodes 13. Each of the plurality of positive electrodes 13 includes a positive electrode collector 13a, and a positive electrode active material layer 13b supported on both surfaces of the positive electrode collector 13a. In addition, the electrode group 11 includes a plurality of negative electrodes 14. Each of the plurality of negative electrodes 14 includes a negative electrode collector 14a, and a negative electrode active material layer 14b supported on both surfaces of the negative electrode collector 14a. One side of the negative electrode collector 14a of each of the negative electrodes 14 protrudes from the negative electrode 14. The protruding negative electrode collector 14a is electrically connected to a strip-like negative electrode terminal 16. A tip end of the strip-like negative electrode terminal 6 is led out to the outside of the exterior member 12. In addition, even though it is not illustrated, in the positive electrode collector 13a of the positive electrode 13, a side positioned on a side opposite to the protruding side of the negative electrode collector 14a protrudes from the positive electrode 13. The positive electrode collector 13a protruding from the positive electrode 13 is electrically connected to the strip-like positive electrode terminal 7. A tip end of the strip-like positive electrode terminal 7 is positioned on a side opposite to the negative electrode terminal 6, and is led out to the outside of the exterior member 12.

Figure 8:
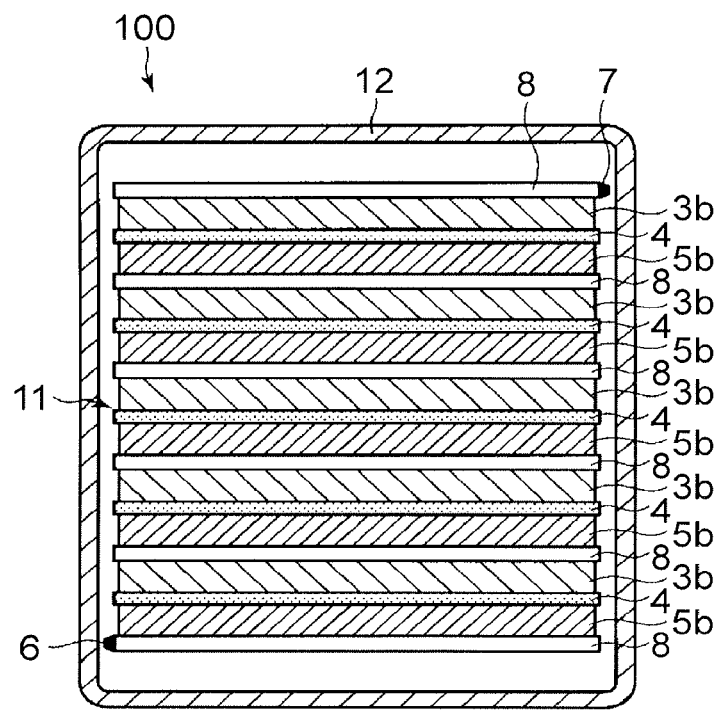
FIG. 8 is a sectional view schematically illustrating another example of the secondary battery according to the first embodiment.

The secondary battery according to this embodiment may have a monopolar structure as described above, or may have a bipolar structure as illustrated in FIG. 8.

The secondary battery 100 illustrated in FIG. 8 is configured as follows. The secondary battery 100 includes the electrode group 11, and the exterior member 12 containing the electrode group 11.

The electrode group 11 includes a first laminated body in which the positive electrode active material layer 5b is formed on one surface of the current collector 8, and the negative electrode active material layer 3b is formed on the other surface. The electrolyte film 4 is formed on the negative electrode active material layer 3b of the first laminated body.

In addition, a second laminated body of one end portion of the electrode group 11, for example, an upper end portion illustrated in FIG. 8, is a laminated body in which the negative electrode active material layer 3b and the electrolyte film 4 are disposed on one surface of the current collector 8 in this order. The positive electrode terminal 7 is electrically connected to the current collector 8 of the second laminated body. Even though it is not illustrated, the positive electrode terminal 7 is led out from the exterior member 12 to the outside.

In addition, a third laminated body of the other end portion of the electrode group 11, for example, a lower end portion illustrated in FIG. 8, is a laminated body in which the positive electrode active material layer 5b is disposed on one surface of the current collector 8. The negative electrode terminal 6 is electrically connected to the current collector 8 of the third laminated body. Even though it is not illustrated, the negative electrode terminal 6 is led out from the exterior member 12 to the outside.

The electrode group 11 having a bipolar electrode structure illustrated in FIG. 8 is configured by laminating the second laminated body, a plurality of first laminated bodies, and the third laminated body, in this order. The number of first laminated bodies can be suitably changed according to the battery design.

A secondary battery having a bipolar electrode structure is compact and has high capacity, and is capable of attaining excellent life properties, excellent thermal stability, and excellent electrochemical stability.

The secondary battery according to the first embodiment may configure an assembled battery. The assembled battery includes a plurality of secondary batteries according to the first embodiment.

In the assembled battery according to the embodiment, the respective single batteries may be disposed to be electrically connected to each other in series or in parallel, or may be disposed in a combination of series connection and parallel connection.

An example of the assembled battery according to the embodiment will be described with reference to the drawings.

Figure 9:
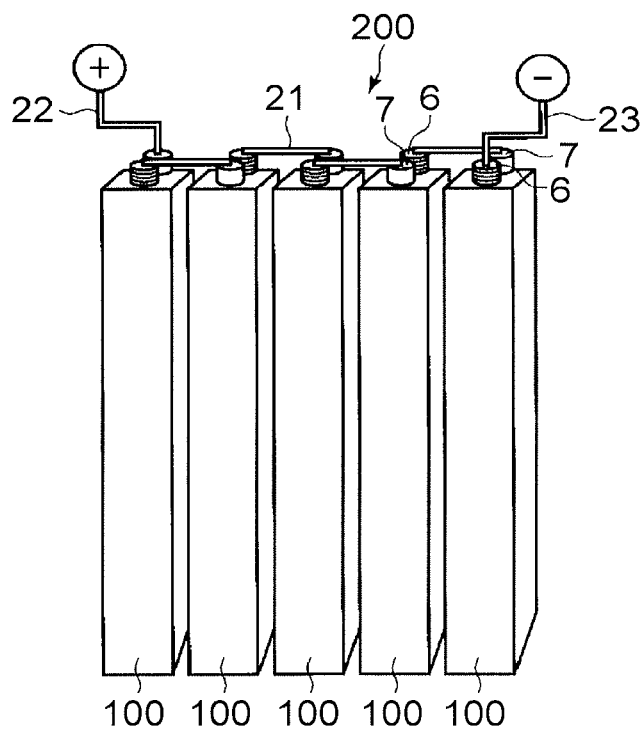
FIG. 9 is a perspective view schematically illustrating an example of an assembled battery according to the first embodiment.

FIG. 9 is a perspective view schematically illustrating an example of the assembled battery according to the embodiment. An assembled battery 200 illustrated in FIG. 9 includes five single batteries 100, four bus bars 21, a positive electrode side lead 22, and a negative electrode side lead 23. Each of five single batteries 100 is the secondary battery according to this embodiment.

The bus bar 21 connects the negative electrode terminal 6 of one single battery 100 to the positive electrode terminal 7 of the single battery 100 positioned in the vicinity of the single battery 100. Thus, five single battery 100 are connected in series by four bus bars 21. That is, the assembled battery 200 of FIG. 9 is a 5-series assembled battery.

As illustrated in FIG. 9, in five single batteries 100, the positive electrode terminal 7 of the single battery 100 positioned in one end portion is connected to the positive electrode side lead 22 for external connection. In addition, in five single batteries 100, the negative electrode terminal 6 of the single battery 100 positioned in the other end portion is connected to the negative electrode side lead 23 for external connection.

The secondary battery according to the first embodiment includes the positive electrode, the negative electrode, the composite electrolyte which is interposed between the positive electrode and the negative electrode, and contains at least one of the inorganic compound particles and the organic compound particles, and the organic electrolyte, and the fibrous substance buried in both of at least one of the positive electrode and the negative electrode, and the composite electrolyte, and thus, it is possible to reduce and suppress the shift or the peeling of the interface between the electrode and the composite electrolyte film, that is, it is possible to have the anchor effect. For this reason, it is possible to suppress an increase in the interface resistance, and it is possible to considerably improve the cycle life. Therefore, the secondary battery is capable of having excellent life properties.

Second Embodiment

According to a second embodiment, a battery pack is provided. The battery pack includes an assembled battery configured of the secondary battery according to the first embodiment or a plurality of secondary batteries.

The battery pack is capable of further including a protective circuit. The protective circuit has a function of controlling discharge and charge of the secondary battery. Alternatively, a circuit included in a device using a battery pack as a power source (for example, an electronic device, an automobile, and the like) may be used as the protective circuit of the battery pack.

In addition, the battery pack is capable of further including an external terminal for energization. The external terminal for energization outputs a current from the secondary battery to the outside, and/or inputs a current into the secondary battery from the outside. In other words, when the battery pack is used as the power source, the current is supplied to the outside through the external terminal for energization. In addition, when the battery pack is charged, a charge current (including regenerative energy of power of an automobile or the like) is supplied to the battery pack through the external terminal for energization.

Figure 10:
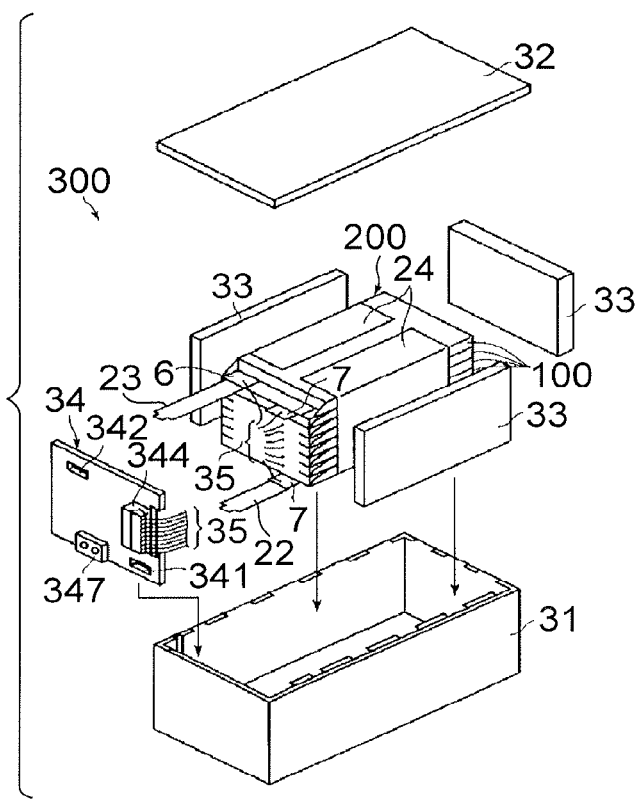
FIG. 10 is an exploded perspective view schematically illustrating an example of a battery pack according to a second embodiment.
Figure 11:
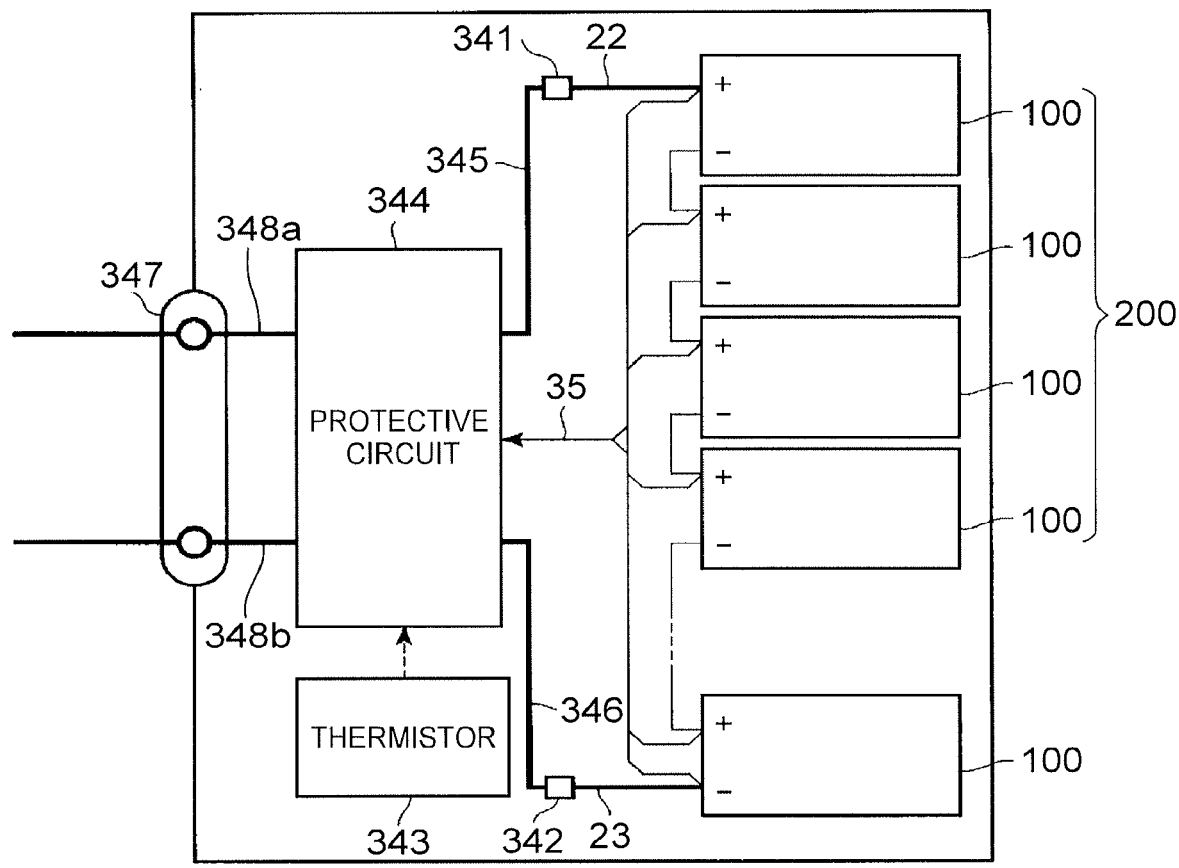
FIG. 11 is a block diagram illustrating an example of an electrical circuit of a battery pack illustrated in FIG. 2.

Next, an example of the battery pack according to the second embodiment will be described with reference to the drawings. FIG. 10 is an exploded perspective view schematically illustrating an example of the battery pack according to the second embodiment. FIG. 11 is a block diagram illustrating an example of an electrical circuit of the battery pack illustrated in FIG. 10.

A battery pack 300 illustrated in FIG. 10 and FIG. 11 includes a container 31, a lid 32, a protective sheet 33, the assembled battery 200, a printed circuit board 34, wiring 35, and an insulating plate (not illustrated).

The container 31 is configured to be capable of containing the protective sheet 33, the assembled battery 200, the printed circuit board 34, and the wiring 35. The lid 32 covers the container 31, and thus, the assembled battery 200 and the like, described above, is contained. Even though it is not illustrated, an opening portion, a connection terminal, or the like for connection with respect to an external device or the like, is disposed in the container 31 and the lid 32.

The protective sheet 33 is disposed on both inside surfaces of the container 31 in a long-side direction, and on one inside surface of the container 31 in a short-side direction. The printed circuit board 34 is disposed on the other inside surface of the container 31 in the short-side direction. The protective sheet 33, for example, is formed of a resin or rubber.

The assembled battery 200 includes the plurality of single batteries 100, the positive electrode side lead 22, the negative electrode side lead 23, and a pressure-sensitive adhesive tape 24. The assembled battery 200 may be one single battery 100.

The single battery 100, for example, has the structure described with reference to FIG. 4 and FIG. 5. At least one of the plurality of single batteries 100 is the secondary battery according to the second embodiment. The plurality of single batteries 100 are evenly laminated such that the negative electrode terminal 6 and the positive electrode terminal 7, extending to the outside, are in the same direction. As illustrated in FIG. 11, the respective plurality of single batteries 100 are electrically connected to each other in series. The plurality of single batteries 100 may be electrically connected to each other in parallel, or may be connected to each other in a combination of series connection and parallel connection. In a case where the plurality of single batteries 100 are connected to each other in parallel, battery capacity increases, compared to a case where the plurality of single batteries 100 are connected to each other in series.

The pressure-sensitive adhesive tape 24 fastens the plurality of single batteries 100. Instead of the pressure-sensitive adhesive tape 24, the plurality of single batteries 100 may be fixed by using a heat shrinkable tape. In this case, the protective sheet 33 is disposed both side surfaces of the assembled battery 200, and the heat shrinkable tape is circulated therearound, and then, the heat shrinkable tape is subjected to heat shrinkage, and thus, the plurality of single batteries 100 are bound.

One end of the positive electrode side lead 22 is connected to the positive electrode terminal 7 of the single battery 100 positioned on the lowermost layer, in a laminated body of the single battery 100. One end of the negative electrode side lead 23 is connected to the negative electrode terminal 6 of the single battery 100 positioned on the uppermost layer, in the laminated body of the single battery 100.

The printed circuit board 34 includes a positive electrode side connector 341, a negative electrode side connector 342, a thermistor 343, a protective circuit 344, wirings 345 and 346, an external terminal 347 for energization, plus side wiring 348a, and minus side wiring 348b. One main surface of the printed circuit board 34 faces a surface on which the negative electrode terminal 6 and the positive electrode terminal 7 extend, in the assembled battery 200. An insulating plate (not illustrated) is interposed between the printed circuit board 34 and the assembled battery 200.

A through hole is provided in the positive electrode side connector 341. The other end of the positive electrode side lead 22 is inserted into the through hole, and thus, the positive electrode side connector 341 and the positive electrode side lead 22 are electrically connected to each other. A through hole is provided in the negative electrode side connector 342. The other end of the negative electrode side lead 23 is inserted into the through hole, and thus, the negative electrode side connector 342 and the negative electrode side lead 23 are electrically connected to each other.

The thermistor 343 is fixed onto one main surface of the printed circuit board 34. The thermistor 343 detects the temperature of each of the single batteries 100, and transmits a detection signal thereof to the protective circuit 344.

The external terminal 347 for energization is fixed onto the other main surface of the printed circuit board 34. The external terminal 347 for energization is electrically connected to a device existing on the outside of the battery pack 300.

The protective circuit 344 is fixed onto the other main surface of the printed circuit board 34. The protective circuit 344 is connected to the external terminal 347 for energization through the plus side wiring 348a. The protective circuit 344 is connected to the external terminal 347 for energization through the minus side wiring 348b. In addition, the protective circuit 344 is electrically connected to the positive electrode side connector 341 through the wiring 345. The protective circuit 344 is electrically connected to the negative electrode side connector 342 through the wiring 346. Further, the protective circuit 344 is electrically connected to each of the plurality of single batteries 100 through the wiring 35.

The protective circuit 344 controls discharge and charge of the plurality of single batteries 100. In addition, the protective circuit 344 blocks electrical connection between the protective circuit 344 and the external terminal 347 for energization to the external device, on the basis of a detection signal transmitted from the thermistor 343 or a detection signal transmitted from each of the single batteries 100 or the assembled battery 200.

Examples of the detection signal transmitted from the thermistor 343 are capable of including a signal of detecting that the temperature of the single battery 100 is higher than or equal to a predetermined temperature. Examples of the detection signal transmitted from each of the single batteries 100 or the assembled battery 200 are capable of including a signal of detecting that overcharge, overdischarge, and overcurrent of the single battery 100. In the case of detecting the overcharge or the like with respect to each of the single batteries 100, a battery voltage may be detected, or a positive electrode potential or a negative electrode potential may be detected. In the latter case, a lithium electrode used as a reference electrode is inserted into each of the single batteries 100.

Furthermore, the circuit of the device using the battery pack 300 as the power source (for example, an electronic device, an automobile, and the like) may be used as the protective circuit 344.

Such a battery pack 300, for example, is used for an application in which excellent cycle life is required at the time of taking out a high current. Specifically, the battery pack 300, for example, is used as a power source of an electronic device, a stationary battery, an in-car battery of a vehicle, or a battery for a rail vehicle. Examples of the electronic device are capable of including a digital camera. The battery pack 300 is particularly preferably used as an in-car battery.

In addition, the battery pack 300 includes the external terminal 347 for energization, as described above. Therefore, the battery pack 300 is capable of outputting a current from the assembled battery 200 to the external device through the external terminal 347 for energization, and of inputting a current from the external device to the assembled battery 200. In other words, when the battery pack 300 is used as the power source, the current from the assembled battery 200 is supplied to the external device through the external terminal 347 for energization. In addition, when the battery pack 300 is charged, a charge current from the external device is supplied to the battery pack 300 through the external terminal 347 for energization. In a case where the battery pack 300 is used as the in-car battery, regenerative energy of the power of the vehicle can be used as the charge current from the external device.

Furthermore, the battery pack 300 may include a plurality of assembled batteries 200. In this case, the plurality of assembled batteries 200 may be connected to each other in series, may be connected to each other in parallel, or may be connected to each other in a combination of series connection and parallel connection. In addition, the printed circuit board 34 and the wiring 35 may be omitted. In this case, the positive electrode side lead 22 and the negative electrode side lead 23 may be used as the external terminal for energization.

A battery pack according to the second embodiment includes the secondary battery according to the first embodiment. Therefore, the battery pack is capable of having excellent life properties.

Third Embodiment

According to a third embodiment, a vehicle is provided. The vehicle includes the battery pack according to the second embodiment.

In the vehicle according to the third embodiment, the battery pack, for example, collects the regenerative energy of the power of the vehicle.

Examples of the vehicle include two-wheel to four-wheel hybrid electrical automobiles, two-wheel to four-wheel electrical automobiles, an assisted bicycle, and a rail vehicle.

A mounting position of the battery pack of the vehicle is not particularly limited. For example, in a case where the battery pack is mounted on the automobile, the battery pack can be mounted in an engine room of the vehicle, on the rear side of a vehicle body, or under the seat.

Next, an example of the vehicle according to the embodiment will be described with reference to the drawings.

Figure 12:
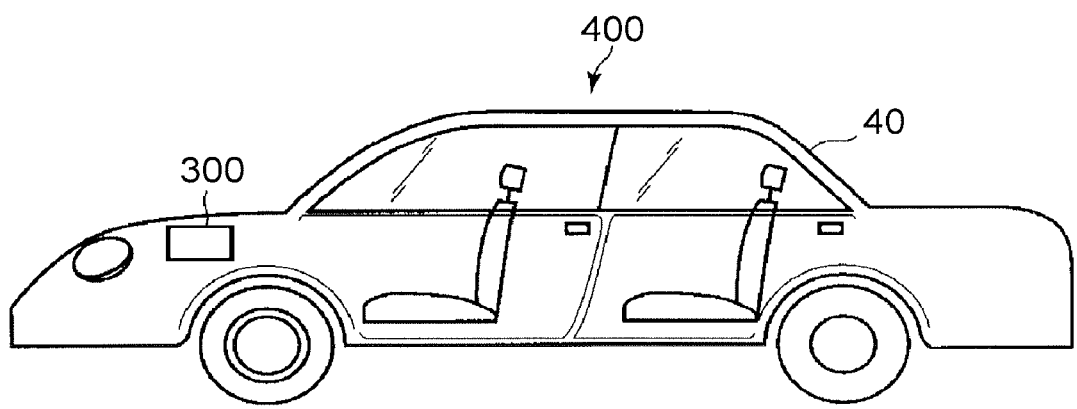
FIG. 12 is a sectional view schematically illustrating an example of a vehicle according to a third embodiment.

FIG. 12 is a sectional view schematically illustrating an example of the vehicle according to the third embodiment.

A vehicle 400 illustrated in FIG. 12 includes a vehicle main body 40, and the battery pack 300 according to the second embodiment. The vehicle 400 illustrated in FIG. 12 is a four-wheel automobile.

The vehicle 400 may include a plurality of battery packs 300. In this case, the battery packs 300 may be connected to each other in series, may be connected to each other in parallel, or may be connected to each other in a combination of series connection and parallel connection.

The battery pack 300 is mounted in an engine room positioned on the front side of the vehicle main body 40. A mounting position of the battery pack 300 is not particularly limited. The battery pack 300 may be mounted on the rear side of the vehicle main body 40 or under the seat. The battery pack 300 can be used as a power source of the vehicle 400.

Figure 13:
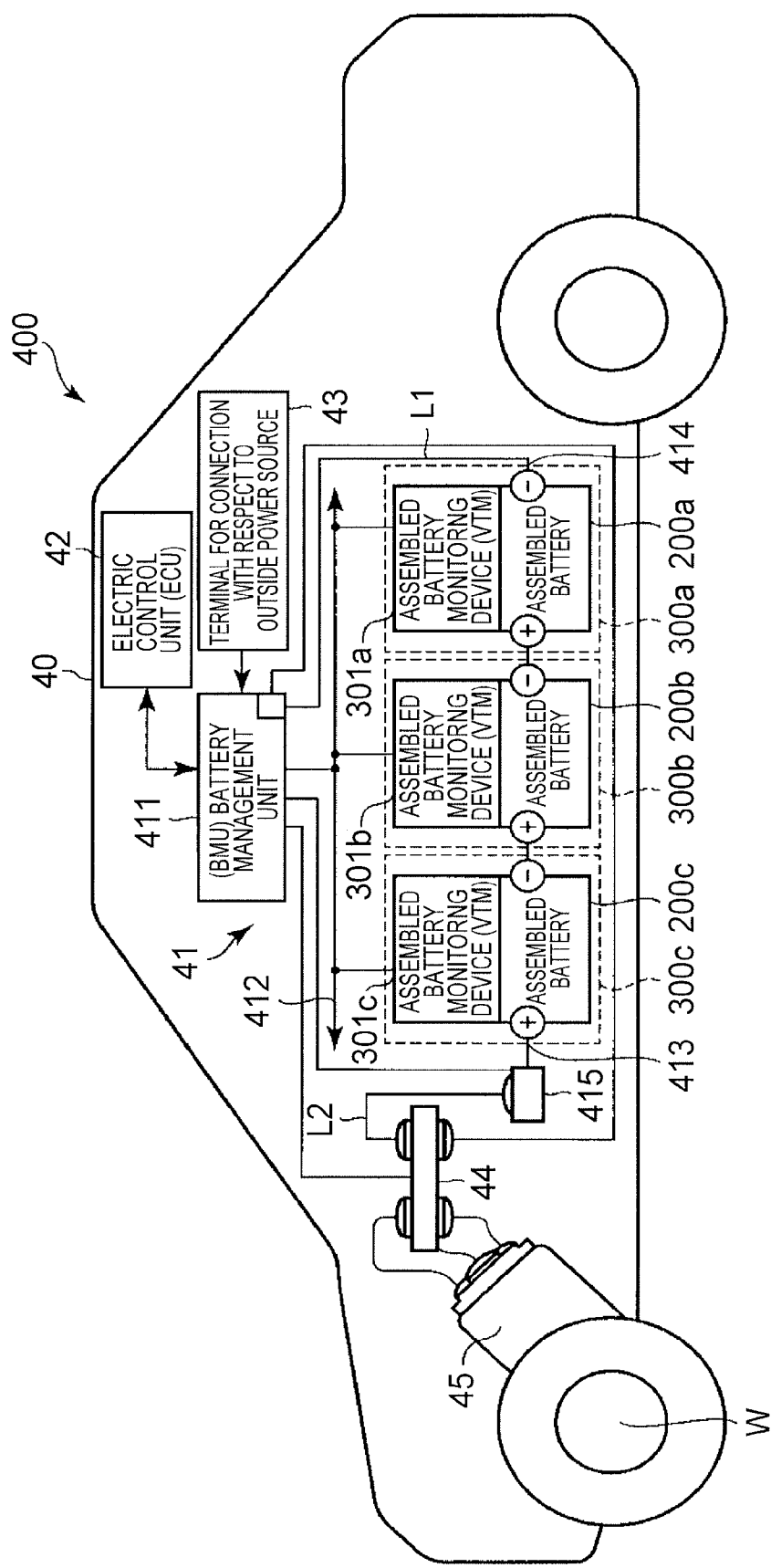
FIG. 13 is a diagram schematically illustrating another example of the vehicle according to the third embodiment.

Next, an aspect of the vehicle according to the third embodiment will be described with reference to FIG. 13. FIG. 13 is a diagram schematically illustrating another example of the vehicle according to the third embodiment. The vehicle 400 illustrated in FIG. 13 is an electrical automobile.

The vehicle 400 illustrated in FIG. 13 includes the vehicle main body 40, a power source 41 for a vehicle, a vehicle electric control unit (ECU) 42, which is a master control unit of the power source 41 for a vehicle, an external terminal (a terminal for connection with respect to the outside power source) 43, an inverter 44, and a driving motor 45.

The vehicle 400 includes the power source 41 for a vehicle, for example, mounted in the engine room, on the rear side of the vehicle body of the automobile, or under the seat. Furthermore, in the vehicle 400 illustrated in FIG. 13, a mounting portion of the power source 41 for a vehicle is schematically illustrated.

The power source 41 for a vehicle includes a plurality of (for example, three) battery packs 300a, 300b, and 300c, a battery management unit (BMU) 411, and a communication bus 412.

Three battery packs 300a, 300b, and 300c are electrically connected to each other in series. The battery pack 300a includes an assembled battery 200a and an assembled battery monitoring device (voltage temperature monitoring (VTM) 301a. The battery pack 300b includes an assembled battery 200b and an assembled battery monitoring device 301b. The battery pack 300c includes an assembled battery 200c and an assembled battery monitoring device 301c. The battery packs 300a, 300b, and 300c can be each independently detached, and can be replaced with another battery pack 300.

Each of the assembled batteries 200a to 200c includes a plurality of single batteries connected to each other in series. At least one of the plurality of single batteries is the secondary battery according to the first embodiment. Each of the assembled batteries 200a to 200c performs discharge and charge through a positive electrode terminal 413 and a negative electrode terminal 414.

In order to collect information relevant to maintenance of the power source 41 for a vehicle, the battery management unit 411 performs communication in the assembled battery monitoring devices 301a to 301c, and collects information relevant to the voltage, the temperature, and the like of the single battery 100 of the assembled batteries 200a to 200c included in the power source 41 for a vehicle.

The communication bus 412 is connected between the battery management unit 411 and the assembled battery monitoring devices 301a to 301c. The communication bus 412 is configured such that a pair of communication lines is shared by a plurality of nodes (the battery management unit and one or more assembled battery monitoring devices). The communication bus 412, for example, is a communication bus configured on the basis of a control area network (CAN) standard.

The assembled battery monitoring devices 301a to 301c measure the voltage and the temperature of each of the single batteries configuring the assembled batteries 200a to 200c, on the basis of a command from the battery management unit 411 according to communication. Here, the temperature can be measured only in several portions per one assembled battery, and it is not necessary to measure the temperature of the entire single battery.

The power source 41 for a vehicle is capable of including an electromagnetic contactor (for example, a switching device 415 illustrated in FIG. 13) for turning on and off the connection between the positive electrode terminal 413 and the negative electrode terminal 414. The switching device 415 includes a precharge switch (not illustrated) which is turned on when the assembled batteries 200a to 200c are charged, and a main switch (not illustrated) which is turned on when battery output is supplied to a load. The precharge switch and the main switch include a relay circuit (not illustrated) which is turned on or off according to a signal supplied to a coil disposed in the vicinity of a switching element.

The inverter 44 converts a direct current voltage which is input, into a high voltage of a three-phase alternate current (AC) for driving a motor. A three-phase output terminal of the inverter 44 is connected to each three-phase input terminal of the driving motor 45. The inverter 44 controls an output voltage on the basis of a control signal from the vehicle ECU 42 for controlling the battery management unit 411 or the entire vehicle operation.

The driving motor 45 is rotated according to power supplied from the inverter 44. The rotation, for example, is transmitted to a wheel axis and a driving wheel W through a differential gear unit.

In addition, even though it is not illustrated, the vehicle 400 includes a regenerative brake mechanism. The regenerative brake mechanism rotates the driving motor 45 at the time of braking the vehicle 400, and converts kinetic energy into regenerative energy as electrical energy. The regenerative energy collected by the regenerative brake mechanism is input into the inverter 44, and is converted into a direct current. The direct current is input into the power source 41 for a vehicle.

One terminal of a connection line L1 is connected to the negative electrode terminal 414 of the power source 41 for a vehicle through a current detection unit (not illustrated) in the battery management unit 411. The other terminal of the connection line L1 is connected to a negative electrode input terminal of the inverter 44.

One terminal of the connection line L2 is connected to the positive electrode terminal 413 of the power source 41 for a vehicle through the switching device 415. The other terminal of the connection line L2 is connected to a positive electrode input terminal of the inverter 44.

The external terminal 43 is connected to the battery management unit 411. The external terminal 43, for example, can be connected to the outside power source.

The vehicle ECU 42 performs cooperative control with respect to the battery management unit 411 along with the other devices in response to manipulation input of a driver or the like, and manages the entire vehicle. Data transmission relevant to the maintenance of the power source 41 for a vehicle, such as remaining capacity of the power source 41 for a vehicle, or the like, is performed between the battery management unit 411 and the vehicle ECU 42 by the communication line.

A vehicle according to the third embodiment includes the battery pack according to the second embodiment. Therefore, according to this embodiment, it is possible to provide a vehicle including the battery pack which is capable of having excellent life properties.

EXAMPLES

Hereinafter, examples will be described, but the embodiments described above are not limited to the following examples.

Example 1

Slurry for a negative electrode active material layer is prepared by blending $Li_4Ti_5O_{12}$ particles having an average particle diameter of 1 μm and a specific surface area of 10 m²/g, a graphite powder having an average particle diameter of 6 μm, as a conductive agent, and PVdF as a binding material at a weight ratio of 95:3:2, by dispersing the blended materials in an n-methyl pyrrolidone (NMP) solvent, and by stirring the materials by using a ball mill in a condition of the number of rotations of 3000 rpm and a stirring time of 1 hour.

Slurry for a positive electrode active material layer is prepared by using $LiNi_{0.6}Co_{0.2}Mn_{0.2}O_2$ having an average particle diameter of 5 μm, by blending 5 weight % of a graphite powder as a conductive agent, with respect to the entire positive electrode, and 5 weight % of PVdF as a binding material, with respect to the entire positive electrode, with $LiNi_{0.6}Co_{0.2}Mn_{0.2}O_2$, and by dispersing the blended materials in an n-methyl pyrrolidone (NMP) solvent.

Slurry for a composite electrolyte layer is prepared by dispersing $Li_{1.2}Zr_{1.9}Ca_{0.1}(PO_4)_3$ particles having a specific surface area of 50 m²/g and a primary particle size (diameter) of 0.1 μm, as lithium-containing inorganic particles, and CeNF as a fibrous substance, in a carboxy methyl cellulose solution, and by adjusting the slurry by adding styrene butadiene rubber.

The lithium-containing inorganic particles, the fibrous substance, carboxy methyl cellulose, and the styrene butadiene rubber are mixed in a predetermined amount such that the ratio is 95:2:1.5:1.5.

The negative electrode slurry is applied onto an aluminum alloy foil having a thickness of 12 um (a purity of 99%), and the composite electrolyte slurry is blown onto the undried surface by using a spray nozzle. The fibrous substance is directed to stick the base at the time of passing through the spray nozzle, and thus, the fibrous substance enters the surface coated with the negative electrode slurry at the time of being blown onto the undried surface coated with the negative electrode slurry. Then, drying is performed in a drying furnace. The same processing is performed with respect to the opposite surface of the aluminum alloy foil, and then, press is performed at a predetermined pressing pressure, and thus, a negative electrode layer having an electrode density of 2 g/cm³, in which a composite electrolyte layer having a thickness of 3 μm is formed on a front surface, is prepared. A negative electrode porosity excluding a current collector and the composite electrolyte layer is 35%, a porosity of a composite solid electrolyte layer excluding the current collector and the negative electrode layer is 60%.

Similarly, the positive electrode slurry is applied onto an aluminum alloy foil having a thickness of 12 um (a purity of 99%), and composite electrolyte slurry not containing the fibrous substance is blown onto the undried surface by using a spray nozzle, and is dried in a drying furnace. The same processing is performed with respect to the opposite surface of the aluminum alloy foil, and then, press is performed at a predetermined pressing pressure, and thus, a positive electrode layer having an electrode density of 3 g/cm³, in which a composite electrolyte layer having a thickness of 3 μm is formed on a front surface, is prepared.

A gel type polyacrylonitrile polymer containing a mixed solvent of propylene carbonate and diethyl carbonate (a volume ratio of 1:2) in which 1 M of $LiPF_6$ is dissolved, is mixed and impregnated into the composite solid electrolyte layer in a predetermined amount such that a weight ratio is 94:4, and is heated, and thus, a gelated composite electrolyte is prepared. Specifically, a mixed solvent of propylene carbonate and diethyl carbonate (a volume ratio of 1:2) in which 1 M of $LiPF_E$ before being gelated is dissolved, and a solution of a polymer of polyacrylonitrile (2 weight %) are injected to be permeated in a gap between the positive electrode and the negative electrode. After that, heating is performed with a gelation agent, and thus, gelation is performed.

A measurement method of negative electrode active material particles and inorganic compound particles is as follows.

A particle diameter of the negative electrode active material particles and the inorganic compound particles is measured by using a laser diffraction distribution device described in the first embodiment.

A BET specific surface area of the inorganic compound particles according to $N_2$ adsorption is measured as with the first embodiment in the following condition.

1 g of the inorganic compound particles or two negative electrodes of 2×2 $cm^2$ are cut out, and are used as a sample. A BET specific surface area measurement device, manufactured by Yuasa Ionics Inc., is used, and nitrogen gas is used as adsorption gas.

The negative electrode and the positive electrode are overlapped to face each other, and thus, an electrode group is prepared. The electrode group is contained in a vessel of a thin metal can having a thickness of 0.25 mm, which is formed of an aluminum alloy (an Al purity of 99%).

On the other hand, a mixed solvent of propylene carbonate (PC) and diethyl carbonate (a volume ratio of 1:2) in which 1 M of $LiPF_6$ before being gelated is dissolved, and a solution of a polymer of polyacrylonitrile (2 weight %) are injected to permeate the gap between the positive electrode and the negative electrode. After that, heating is performed with a gelation agent, and thus, gelation is performed.

A square non-aqueous electrolyte secondary battery having a structure illustrated in FIG. 4 described above, a thickness of 13 mm, a width of 62 mm, and a height of 96 mm, is prepared.

In the secondary battery prepared as described above, <Fibrous Substance>, <Fibrous Substance Average Diameter>, <Fibrous Substance Content Rate>, <Weight % of Fibrous Substance>, <Binding Material Content Rate (%) of Composite Electrolyte>, <Measurement of Initial Capacity (mAh)>, and <Evaluation of Cycle Life> are measured and evaluated, and are described in Table 1.

The measurement of the average diameter of the fibrous substance, the measurement of the content rate of the fibrous substance, the measurement of weight % of the fibrous substance, and the measurement of the binding material content rate of the composite electrolyte are respectively performed according to the method described in the first embodiment. The results are shown in Table 1.

<Measurement of Initial Capacity (mAh)>

The battery is subjected to initial charge at a constant current of 1 A up to 2.8 V under an environment of 25° C., and is subjected to charge at a constant voltage of 2.8 V, and the charge is ended at a current of 0.05 A, and then, the capacity of the battery at the time of performing initial discharge at 1 A up to 1.5 V, is confirmed. The results are shown in Table 1.

<Evaluation of Cycle Life>

A capacity maintenance rate (%) is used. In the capacity maintenance rate, measurement is performed up to 1000 cycles in the same condition as that of measuring the initial capacity, and discharge capacity of the 1000th cycle is set to an initial discharge capacity ratio. The results are shown in Table 1.

Positive electrode active materials, negative electrode active materials, lithium-containing inorganic particles, fibrous substances, binding materials, and states of electrolytes described in Tables 1 to 4 are used in Examples 2 to 55, and positive electrode active materials, negative electrode active materials, lithium-containing inorganic particles, fibrous substances, binding materials, and states of electrolytes described in Table 5 are used in Comparative Examples 1 to 11, and a composite electrolyte containing the fibrous substance is applied onto at least one of the positive electrode and the negative electrode, and thus, an electrode in which the fibrous substance is buried, is prepared, and a secondary battery is prepared. The results of each of the examples and the comparative examples are described in Tables 6 to 10.

In the tables, in a case where the electrolyte is "Liquid Electrolyte", the liquid electrolyte is injected without gelating the electrolyte.

Furthermore, "-" in the tables, indicates a blank of not being mixed.

TABLE 1

| | Positive electrode active material Type | Negative electrode active material Type | Inorganic compound particles | | Fibrous substance | | |
|---|---|---|---|---|---|---|---|
| | | | Type | Content rate (wt %) | Type | Diameter (nm) | Content rate (wt %) |
| Example 1 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 2 | 2 |
| Example 2 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 10 | 2 |
| Example 3 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 50 | 2 |
| Example 4 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 100 | 2 |
| Example 5 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 500 | 2 |
| Example 6 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 1000 | 2 |
| Example 7 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 97 | CeNF | 5 | 0.1 |
| Example 8 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 96 | CeNF | 5 | 1 |
| Example 9 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 92 | CeNF | 5 | 5 |
| Example 10 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 87 | CeNF | 5 | 10 |
| Example 11 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 47 | CeNF | 5 | 99 |
| Example 12 | $LiNi_{0.6}Co_{0.6}Mn_{0.6}O_2$ | $Li_4Ti_5O_{12}$ | $Li_{1.3}Al_{0.3}Ti_{1.7}(PO_3)_4$ | 95 | CeNF | 5 | 2 |
| Example 13 | $LiNi_{0.6}Co_{0.6}Mn_{0.6}O_2$ | $Li_4Ti_5O_{12}$ | $Li_{1.3}Al_{0.3}Ti_{1.7}(PO_3)_4$ | 95 | CeNF | 5 | 2 |

TABLE 1-continued

| | Positive electrode active material | Negative electrode active material | Inorganic compound particles | Content rate (wt %) | Fibrous substance Type | Diameter (nm) | Content rate (wt %) |
|---|---|---|---|---|---|---|---|
| Example 14 | $LiNi_{0.6}Co_{0.6}Mn_{0.6}O_2$ | $Li_4Ti_5O_{12}$ | $Li_{1.3}Al_{0.3}Ti_{1.7}(PO_3)_4$ | 95 | CeNF | 5 | 2 |
| Example 15 | $LiNi_{0.6}Co_{0.6}Mn_{0.6}O_2$ | $Li_4Ti_5O_{12}$ | $Li_7La_3Zr_2O_{12}$ | 95 | CeNF | 5 | 2 |
| Example 16 | $LiNi_{0.6}Co_{0.6}Mn_{0.6}O_2$ | $TiNb_2O_7$ | $Li_{1.2}Zr_{1.9}Ca_{0.1}(PO_4)_3$ | 95 | CeNF | 5 | 2 |
| Example 17 | $LiNi_{0.6}Co_{0.6}Mn_{0.6}O_2$ | $Li_2Na_{1.5}Ti_{5.5}Nb_{0.5}O_{14}$ | $Li_{1.2}Zr_{1.9}Ca_{0.1}(PO_4)_3$ | 95 | CeNF | 5 | 2 |
| Example 18 | $LiNi_{0.6}Co_{0.6}Mn_{0.6}O_2$ | $Li_4Ti_5O_{12}$ | $BaTiO_3$ | 95 | CeNF | 5 | 2 |
| Example 19 | $LiNi_{0.6}Co_{0.6}Mn_{0.6}O_2$ | $Li_4Ti_5O_{12}$ | $SrTiO_3$ | 95 | CeNF | 5 | 2 |

| | Binding material Type | Content rate (wt %) | Electrolyte | Electrode in which fibrous substance is buried |
|---|---|---|---|---|
| Example 1 | SBR | 3 | Gel type electrolyte | Negative electrode |
| Example 2 | SBR | 3 | Gel type electrolyte | Negative electrode |
| Example 3 | SBR | 3 | Gel type electrolyte | Negative electrode |
| Example 4 | SBR | 3 | Gel type electrolyte | Negative electrode |
| Example 5 | SBR | 3 | Gel type electrolyte | Negative electrode |
| Example 6 | SBR | 3 | Gel type electrolyte | Negative electrode |
| Example 7 | SBR | 2.9 | Gel type electrolyte | Negative electrode |
| Example 8 | SBR | 3 | Gel type electrolyte | Negative electrode |
| Example 9 | SBR | 3 | Gel type electrolyte | Negative electrode |
| Example 10 | SBR | 3 | Gel type electrolyte | Negative electrode |
| Example 11 | SBR | 3 | Gel type electrolyte | Negative electrode |
| Example 12 | SBR | 3 | Gel type electrolyte | Negative electrode |
| Example 13 | SBR | 3 | Gel type electrolyte | Negative electrode |
| Example 14 | SBR | 3 | Gel type electrolyte | Negative electrode |
| Example 15 | SBR | 3 | Gel type electrolyte | Negative electrode |
| Example 16 | SBR | 3 | Gel type electrolyte | Negative electrode |
| Example 17 | SBR | 3 | Gel type electrolyte | Negative electrode |
| Example 18 | SBR | 3 | Gel type electrolyte | Negative electrode |
| Example 19 | SBR | 3 | Gel type electrolyte | Negative electrode |

TABLE 2

| | Positive electrode active material Type | Negative electrode active material Type | Inorganic compound particles Type | Content rate (wt %) | Fibrous substance Type | Diameter (nm) | Content rate (wt %) |
|---|---|---|---|---|---|---|---|
| Example 20 | $LiNi_{0.6}Co_{0.6}Mn_{0.6}O_2$ | $TiNb_2O_7$ | $Li_{1.2}Zr_{1.9}Ca_{0.1}(PO_4)_3$ | 95 | Alumina fiber | 10 | 2 |
| Example 21 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | Alumina fiber | 10 | 2 |
| Example 22 | $LiNi_{0.6}Co_{0.6}Mn_{0.6}O_2$ | $Li_2Na_{1.5}Ti_{5.5}Nb_{0.5}O_{14}$ | $Li_{1.2}Zr_{1.9}Ca_{0.1}(PO_4)_3$ | 95 | Alumina fiber | 10 | 2 |

TABLE 2-continued

| | | | | | | | | Binding material | | | Electrode in which fibrous |
| --- | --- | --- | --- | --- | --- | --- | --- | --- | --- | --- | --- |
| | | | | | | | | Type | Content rate (wt %) | Electrolyte | substance is buried |
| Example 23 | LiMn$_2$O$_4$(LMO) | TiNb$_2$O$_7$ | Li$_{1.2}$Zr$_{1.9}$Ca$_{0.1}$(PO$_4$)$_3$ | 95 | Alumina fiber | 10 | 2 | | | | |
| Example 24 | LiMn$_2$O$_4$(LMO) | Li$_4$Ti$_5$O$_{12}$ | Li$_{1.2}$Zr$_{1.9}$Ca$_{0.1}$(PO$_4$)$_3$ | 95 | Alumina fiber | 10 | 2 | | | | |
| Example 25 | LiNi$_{0.6}$Co$_{0.6}$Mn$_{0.6}$O$_2$ | TiNb$_2$O$_7$ | Li$_{1.2}$Zr$_{1.9}$Ca$_{0.1}$(PO$_4$)$_3$ | 95 | CeNF | 10 | 2 | | | | |
| Example 26 | LiNi$_{0.6}$Co$_{0.6}$Mn$_{0.6}$O$_2$ | Li$_4$Ti$_5$O$_{12}$ | Li$_{1.2}$Zr$_{1.9}$Ca$_{0.1}$(PO$_4$)$_3$ | 95 | CeNF | 10 | 2 | | | | |
| Example 27 | LiNi$_{0.6}$Co$_{0.6}$Mn$_{0.6}$O$_2$ | Li$_2$Na$_{1.5}$Ti$_{5.5}$Nb$_{0.5}$O$_{14}$ | Li$_{1.2}$Zr$_{1.9}$Ca$_{0.1}$(PO$_4$)$_3$ | 95 | CeNF | 10 | 2 | | | | |
| Example 28 | LiMn$_2$O$_4$(LMO) | TiNb$_2$O$_7$ | Li$_{1.2}$Zr$_{1.9}$Ca$_{0.1}$(PO$_4$)$_3$ | 95 | CeNF | 10 | 2 | | | | |
| Example 29 | LiMn$_2$O$_4$(LMO) | Li$_4$Ti$_5$O$_{12}$ | Li$_{1.2}$Zr$_{1.9}$Ca$_{0.1}$(PO$_4$)$_3$ | 95 | CeNF | 10 | 2 | | | | |
| Example 30 | LiNi$_{0.6}$Co$_{0.6}$Mn$_{0.6}$O$_2$ | TiNb$_2$O$_7$ | Li$_{1.2}$Zr$_{1.9}$Ca$_{0.1}$(PO$_4$)$_3$ | 95 | Alumina fiber | 10 | 2 | | | | |
| Example 31 | LiNi$_{0.6}$Co$_{0.6}$Mn$_{0.6}$O$_2$ | Li$_4$Ti$_5$O$_{12}$ | Li$_{1.2}$Zr$_{1.9}$Ca$_{0.1}$(PO$_4$)$_3$ | 95 | CeNF | 2 | 2 | | | | |
| Example 32 | LiMn$_2$O$_4$(LMO) | Li$_4$Ti$_5$O$_{12}$ | Li$_{1.2}$Zr$_{1.9}$Ca$_{0.1}$(PO$_4$)$_3$ | 95 | CeNF | 2 | 2 | | | | |
| Example 33 | LiCoO$_2$(LCO) | Li$_4$Ti$_5$O$_{12}$ | Li$_{1.2}$Zr$_{1.9}$Ca$_{0.1}$(PO$_4$)$_3$ | 95 | CeNF | 2 | 2 | | | | |
| Example 34 | LiMn$_2$O$_4$(LMO) | Li$_4$Ti$_5$O$_{12}$ | Li$_{1.2}$Zr$_{1.9}$Ca$_{0.1}$(PO$_4$)$_3$ | 95 | Alumina fiber | 10 | 2 | | | | |
| Example 35 | LiCoO$_2$(LCO) | Li$_4$Ti$_5$O$_{12}$ | Li$_{1.2}$Zr$_{1.9}$Ca$_{0.1}$(PO$_4$)$_3$ | 95 | Alumina fiber | 10 | 2 | | | | |
| Example 20 | | | | | | | | SBR | 3 | Gel type electrolyte | Negative electrode |
| Example 21 | | | | | | | | SBR | 3 | Gel type electrolyte | Negative electrode |
| Example 22 | | | | | | | | SBR | 3 | Gel type electrolyte | Negative electrode |
| Example 23 | | | | | | | | SBR | 3 | Gel type electrolyte | Negative electrode |
| Example 24 | | | | | | | | SBR | 3 | Gel type electrolyte | Negative electrode |
| Example 25 | | | | | | | | SBR | 3 | Liquid electrolyte | Negative electrode |
| Example 26 | | | | | | | | SBR | 3 | Liquid electrolyte | Negative electrode |
| Example 27 | | | | | | | | SBR | 3 | Liquid electrolyte | Negative electrode |
| Example 28 | | | | | | | | SBR | 3 | Liquid electrolyte | Negative electrode |
| Example 29 | | | | | | | | SBR | 3 | Liquid electrolyte | Negative electrode |

TABLE 2-continued

| | | | | | |
|---|---|---|---|---|---|
| | | Example 30 | SBR | 3 | Liquid electrolyte | Negative electrode |
| | | Example 31 | PVdF | 3 | Gel type electrolyte | Negative electrode |
| | | Example 32 | PVdF | 3 | Gel type electrolyte | Negative electrode |
| | | Example 33 | PVdF | 3 | Gel type electrolyte | Negative electrode |
| | | Example 34 | PVdF | 3 | Gel type electrolyte | Negative electrode |
| | | Example 35 | PVdF | 3 | Gel type electrolyte | Negative electrode |

TABLE 3

| | Positive electrode active material Type | Negative electrode active material Type | Inorganic compound particles | | Fibrous substance | |
|---|---|---|---|---|---|---|
| | | | Type | Content rate (wt %) | Type | Diameter (nm) | Content rate (wt %) |
| Example 36 | $LiMn_2O_4$(LMO) | $Li_4Ti_5O_{12}$ | $Li_{1.2}Zr_{1.9}Ca_{0.1}(PO_4)_3$ | 95 | CeNF | 2 | 2 |
| Example 37 | $LiCoO_2$(LCO) | $Li_4Ti_5O_{12}$ | $Li_{1.2}Zr_{1.9}Ca_{0.1}(PO_4)_3$ | 95 | CeNF | 2 | 2 |
| Example 38 | $LiMn_2O_4$(LMO) | $TiNb_2O_7$ | $Li_{1.2}Zr_{1.9}Ca_{0.1}(PO_4)_3$ | 95 | CeNF | 5 | 2 |
| Example 39 | $LiCoO_2$(LCO) | $TiNb_2O_7$ | $Li_{1.2}Zr_{1.9}Ca_{0.1}(PO_4)_3$ | 95 | CeNF | 5 | 2 |
| Example 40 | $LiMn_2O_4$(LMO) | $Li_2Na_{1.5}Ti_{5.5}Nb_{0.5}O_{14}$ | $Li_{1.2}Zr_{1.9}Ca_{0.1}(PO_4)_3$ | 95 | CeNF | 5 | 2 |
| Example 41 | $LiCoO_2$(LCO) | $Li_2Na_{1.5}Ti_{5.5}Nb_{0.5}O_{14}$ | $Li_{1.2}Zr_{1.9}Ca_{0.1}(PO_4)_3$ | 95 | CeNF | 5 | 2 |
| Example 42 | $LiMn_2O_4$(LMO) | $Li_4Ti_5O_{12}$ | $BaTiO_3$ | 95 | CeNF | 5 | 2 |
| Example 43 | $LiCoO_2$(LCO) | $Li_4Ti_5O_{12}$ | $BaTiO_3$ | 95 | CeNF | 5 | 2 |
| Example 44 | $LiMn_2O_4$(LMO) | $Li_4Ti_5O_{12}$ | $SrTiO_3$ | 95 | CeNF | 5 | 2 |
| Example 45 | $LiCoO_2$(LCO) | $Li_4Ti_5O_{12}$ | $SrTiO_3$ | 95 | CeNF | 5 | 2 |
| Example 46 | $LiCoO_2$(LCO) | $TiNb_2O_7$ | $Li_{1.2}Zr_{1.9}Ca_{0.1}(PO_4)_3$ | 95 | Alumina fiber | 10 | 2 |
| Example 47 | $LiCoO_2$(LCO) | $Li_4Ti_5O_{12}$ | $Li_{1.2}Zr_{1.9}Ca_{0.1}(PO_4)_3$ | 95 | Alumina fiber | 10 | 2 |
| Example 48 | $LiCoO_2$(LCO) | $TiNb_2O_7$ | $Li_{1.2}Zr_{1.9}Ca_{0.1}(PO_4)_3$ | 95 | CeNF | 10 | 2 |
| Example 49 | $LiCoO_2$(LCO) | $Li_4Ti_5O_{12}$ | $Li_{1.2}Zr_{1.9}Ca_{0.1}(PO_4)_3$ | 95 | CeNF | 10 | 2 |
| Example 50 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | Alumina fiber | 10 | 2 |

| | Binding material | | Electrolyte | Electrode in which fibrous substance is buried |
|---|---|---|---|---|
| | Type | Content rate (wt %) | | |
| Example 36 | SBR | 3 | Gel type electrolyte | Positive electrode |
| Example 37 | SBR | 3 | Gel type electrolyte | Positive electrode |

TABLE 3-continued

| | | | | |
|---|---|---|---|---|
| Example 38 | SBR | 3 | Gel type electrolyte | Positive electrode |
| Example 39 | SBR | 3 | Gel type electrolyte | Positive electrode |
| Example 40 | SBR | 3 | Gel type electrolyte | Positive electrode |
| Example 41 | SBR | 3 | Gel type electrolyte | Positive electrode |
| Example 42 | SBR | 3 | Gel type electrolyte | Positive electrode |
| Example 43 | SBR | 3 | Gel type electrolyte | Positive electrode |
| Example 44 | SBR | 3 | Gel type electrolyte | Positive electrode |
| Example 45 | SBR | 3 | Gel type electrolyte | Positive electrode |
| Example 46 | SBR | 3 | Gel type electrolyte | Positive electrode |
| Example 47 | SBR | 3 | Gel type electrolyte | Positive electrode |
| Example 48 | SBR | 3 | Liquid electrolyte | Positive electrode |
| Example 49 | SBR | 3 | Liquid electrolyte | Positive electrode |
| Example 50 | SBR | 3 | Liquid electrolyte | Positive electrode |

TABLE 4

| | Positive electrode active material Type | Negative electrode active material Type | Inorganic compound particles | | Fibrous substance | | |
|---|---|---|---|---|---|---|---|
| | | | Type | Content rate (wt %) | Type | Diameter (nm) | Content rate (wt %) |
| Example 51 | $LiMn_2O_4$(LMO) | $Li_2Na_{1.5}Ti_{5.5}Nb_{0.5}O_{14}$ | $Li_{1.2}Zr_{1.9}Ca_{0.1}(PO_4)_3$ | 95 | Alumina fiber | 10 | 2 |
| Example 52 | $LiCoO_2$(LCO) | $Li_2Na_{1.5}Ti_{5.5}Nb_{0.5}O_{14}$ | $Li_{1.2}Zr_{1.9}Ca_{0.1}(PO_4)_3$ | 95 | Alumina fiber | 10 | 2 |
| Example 53 | $LiMn_2O_4$(LMO) | $Li_2Na_{1.5}Ti_{5.5}Nb_{0.5}O_{14}$ | $Li_{1.2}Zr_{1.9}Ca_{0.1}(PO_4)_3$ | 95 | CeNF | 10 | 2 |

TABLE 4-continued

| | | | | | | | |
|---|---|---|---|---|---|---|---|
| Example 54 | $LiCoO_2$(LCO) | $Li_2Na_{1.5}Ti_{5.5}Nb_{0.5}O_{14}$ | $Li_{1.2}Zr_{1.9}Ca_{0.1}(PO_4)_3$ | 95 | CeNF | 10 | 2 |
| Example 55 | $LiNi_{0.6}Co_{0.6}Mn_{0.6}O_2$ | $Li_2Na_{1.5}Ti_{5.5}Nb_{0.5}O_{14}$ | $Li_{1.2}Zr_{1.9}Ca_{0.1}(PO_4)_3$ | 95 | Alumina fiber | 10 | 2 |

| | Binding material | | Electrolyte | Electrode in which fibrous substance is buried |
|---|---|---|---|---|
| | Type | Content rate (wt %) | | |
| Example 51 | SBR | 3 | Gel type electrolyte | Both electrodes |
| Example 52 | SBR | 3 | Gel type electrolyte | Both electrodes |
| Example 53 | SBR | 3 | Liquid electrolyte | Both electrodes |
| Example 54 | SBR | 3 | Liquid electrolyte | Both electrodes |
| Example 55 | SBR | 3 | Liquid electrolyte | Both electrodes |

TABLE 5

| | Positive electrode active material Type | Negative electrode active material Type | Inorganic compound particles | | Fibrous substance | | |
|---|---|---|---|---|---|---|---|
| | | | Type | Content rate (wt %) | Type | Diameter (nm) | Content rate (wt %) |
| Comparative Example 1 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 97 | — | — | 0 |
| Comparative Example 2 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 97 | — | — | 0 |
| Comparative Example 3 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 97 | — | — | 0 |
| Comparative Example 4 | $LiNi_{0.6}Co_{0.6}Mn_{0.6}O_2$ | $Li_4Ti_5O_{12}$ | $Li_{1.2}Zr_{1.9}Ca_{0.1}(PO_4)_3$ | 95 | CeNF | 2000 | 2 |
| Comparative Example 5 | $LiNi_{0.6}Co_{0.6}Mn_{0.6}O_2$ | $Li_4Ti_5O_{12}$ | — | 0 | CeNF | 5 | 97 |
| Comparative Example 6 | $LiNi_{0.6}Co_{0.6}Mn_{0.6}O_2$ | $Li_4Ti_5O_{12}$ | $Al_2O_3$ | 95 | CeNF | 5 | 2 |
| Comparative Example 7 | $LiNi_{0.6}Co_{0.6}Mn_{0.6}O_2$ | $Li_4Ti_5O_{12}$ | $SiO_2$ | 95 | CeNF | 5 | 2 |
| Comparative Example 8 | $LiNi_{0.6}Co_{0.6}Mn_{0.6}O_2$ | $Li_4Ti_5O_{12}$ | $TiO_2$ | 95 | CeNF | 5 | 2 |

TABLE 5-continued

| | | | | | | | |
|---|---|---|---|---|---|---|---|
| Comparative Example 9 | $LiNi_{0.6}Co_{0.6}Mn_{0.6}O_2$ | $TiNb_2O_7$ | $Al_2O_3$ | 95 | Alumina fiber | 1 | 2 |
| Comparative Example 10 | $LiNi_{0.6}Co_{0.6}Mn_{0.6}O_2$ | $TiNb_2O_7$ | $Al_2O_3$ | 95 | CeNF | 2 | 2 |
| Comparative Example 11 | $LiNi_{0.6}Co_{0.6}Mn_{0.6}O_2$ | $TiNb_2O_7$ | $SiO_2$ | 95 | Alumina fiber | 1 | 2 |

| | Binding material | | Electrolyte | Electrode in which fibrous substance is buried |
|---|---|---|---|---|
| | Type | Content rate (wt %) | | |
| Comparative Example 1 | SBR | 3 | Gel type electrolyte | Negative electrode |
| Comparative Example 2 | SBR | 3 | Gel type electrolyte | Positive electrode |
| Comparative Example 3 | SBR | 3 | Gel type electrolyte | Both electrodes |
| Comparative Example 4 | SBR | 3 | Gel type electrolyte | Negative electrode |
| Comparative Example 5 | SBR | 3 | Gel type electrolyte | Negative electrode |
| Comparative Example 6 | SBR | 3 | Gel type electrolyte | Negative electrode |
| Comparative Example 7 | SBR | 3 | Gel type electrolyte | Negative electrode |
| Comparative Example 8 | SBR | 3 | Gel type electrolyte | Negative electrode |
| Comparative Example 9 | SBR | 3 | Gel type electrolyte | Negative electrode |
| Comparative Example 10 | SBR | 3 | Liquid electrolyte | Negative electrode |
| Comparative Example 11 | SBR | 3 | Liquid electrolyte | Negative electrode |

TABLE 6

| | Evaluation result | |
|---|---|---|
| | 25° C. initial capacity (mAh) | 25° C. capacity maintenance rate after 1000 cycles (%) |
| Example 1 | 1003 | 95 |
| Example 2 | 1003 | 96 |
| Example 3 | 1002 | 96 |
| Example 4 | 1000 | 95 |
| Example 5 | 1000 | 94 |
| Example 6 | 996 | 93 |
| Example 7 | 1003 | 90 |
| Example 8 | 1000 | 93 |

TABLE 6-continued

|  | Evaluation result | |
|---|---|---|
|  | 25° C. initial capacity (mAh) | 25° C. capacity maintenance rate after 1000 cycles (%) |
| Example 9 | 998 | 95 |
| Example 10 | 998 | 94 |
| Example 11 | 998 | 93 |
| Example 12 | 1000 | 96 |
| Example 13 | 999 | 95 |
| Example 14 | 999 | 96 |
| Example 15 | 988 | 91 |
| Example 16 | 996 | 98 |
| Example 17 | 976 | 97 |
| Example 18 | 974 | 94 |
| Example 19 | 991 | 92 |

TABLE 7

|  | Evaluation result | |
|---|---|---|
|  | 25° C. initial capacity (mAh) | 25° C. capacity maintenance rate after 1000 cycles (%) |
| Example 20 | 990 | 95 |
| Example 21 | 990 | 94 |
| Example 22 | 980 | 98 |
| Example 23 | 989 | 94 |
| Example 24 | 988 | 93 |
| Example 25 | 990 | 96 |
| Example 26 | 990 | 96 |
| Example 27 | 980 | 99 |
| Example 28 | 987 | 96 |
| Example 29 | 987 | 96 |
| Example 30 | 989 | 91 |
| Example 31 | 985 | 91 |
| Example 32 | 984 | 91 |
| Example 33 | 985 | 92 |
| Example 34 | 981 | 90 |
| Example 35 | 982 | 91 |

TABLE 8

|  | Evaluation result | |
|---|---|---|
|  | 25° C. initial capacity (mAh) | 25° C. capacity maintenance rate after 1000 cycles (%) |
| Example 36 | 1002 | 94 |
| Example 37 | 1003 | 95 |
| Example 38 | 1002 | 96 |
| Example 39 | 1003 | 96 |
| Example 40 | 985 | 89 |
| Example 41 | 985 | 91 |
| Example 42 | 979 | 96 |
| Example 43 | 976 | 96 |
| Example 44 | 977 | 95 |
| Example 45 | 975 | 96 |
| Example 46 | 990 | 95 |
| Example 47 | 990 | 95 |
| Example 48 | 990 | 97 |
| Example 49 | 990 | 97 |
| Example 50 | 989 | 92 |

TABLE 9

|  | Evaluation result | |
|---|---|---|
|  | 25° C. initial capacity (mAh) | 25° C. capacity maintenance rate after 1000 cycles (%) |
| Example 51 | 990 | 89 |
| Example 52 | 991 | 89 |

TABLE 9-continued

|  | Evaluation result | |
|---|---|---|
|  | 25° C. initial capacity (mAh) | 25° C. capacity maintenance rate after 1000 cycles (%) |
| Example 53 | 987 | 89 |
| Example 54 | 987 | 88 |
| Example 55 | 977 | 90 |

TABLE 10

|  | Evaluation result | |
|---|---|---|
|  | 25° C. initial capacity (mAh) | 25° C. capacity maintenance rate after 1000 cycles (%) |
| Comparative Example 1 | 980 | 70 |
| Comparative Example 2 | 990 | 67 |
| Comparative Example 3 | 990 | 62 |
| Comparative Example 4 | 969 | 78 |
| Comparative Example 5 | 971 | 72 |
| Comparative Example 6 | 975 | 67 |
| Comparative Example 7 | 977 | 56 |
| Comparative Example 8 | 974 | 52 |
| Comparative Example 9 | 978 | 55 |
| Comparative Example 10 | 990 | 79 |
| Comparative Example 11 | 988 | 52 |

As it is obvious from Tables 6 to 10, in the secondary batteries of Examples 1 to 55, the initial capacity increases, and thus, a high maintenance rate is obtained even at the capacity maintenance rate after 1000 cycles, compared to Comparative Examples 1 to 11.

In Comparative Examples 1 to 3, it is considered that CeNF is not used, and thus, the anchor effect is not capable of being exhibited, a lithium ion path cut due to a volume change of discharge and charge increases, and the capacity maintenance rate decreases. In Comparative Example 4, it is considered that CeNF is added, but the diameter thereof is large, and thus, electronic resistance existing as an electronic resistance component increases, and the capacity maintenance rate decreases. In Comparative Example 5, it is considered that a large amount of CeNF is contained, but the solid electrolyte is not contained, and thus, it is necessary to repeat desolvation by the gel electrolyte, and the capacity maintenance rate decreases without catching up discharge and charge as a reaction rate. In Comparative Examples 6 to 11, it is considered that the inorganic material which is not the solid electrolyte, is applied, and thus, the inorganic material becomes a resistance component electronically and ionically, and the capacity maintenance rate considerably decreases.

According to at least one of the embodiments and the examples described above, the secondary battery is provided. The secondary battery contains the fibrous substance linking at least one of the positive electrode and the negative electrode with at least a part of the composite electrolyte. By containing such a fibrous substance, it is possible to reduce and suppress the shift or the peeling of the interface between the electrode and the composite electrolyte film. For this reason, it is possible to suppress an increase in the interface resistance, and to provide a secondary battery having excellent cycle life.

Furthermore, the invention is not limited to the embodiments described above, and can be embodied by modifying the constituents in the practical phase, within a range not departing from the gist. In addition, various inventions can be formed, according to a suitable combination of a plurality of constituents disclosed in the embodiments described above. For example, several constituents may be omitted from all of the constituents described in the embodiments. Further, constituents of different embodiments may be suitably combined.

What is claimed is:

1. A secondary battery comprising:
a positive electrode;
a negative electrode arranged opposite to the positive electrode;
a composite electrolyte interposed between the positive electrode and the negative electrode, the composite electrolyte comprising an organic electrolyte and at least one of inorganic compound particles and organic compound particles; and
a fibrous substance extending from the composite electrolyte to at least one of the positive electrode and the negative electrode through their interface.

2. The secondary battery according to claim 1,
wherein the fibrous substance is at least one of cellulose and inorganic material.

3. The secondary battery according to claim 2,
wherein the inorganic material is, at least one of alumna, silica and boehmite.

4. The secondary battery according to claim 1,
wherein an average diameter of the fibrous substance is more than or equal to 1 nm and less than or equal to 1000 nm.

5. The secondary battery according to claim 1,
wherein an average diameter of the fibrous substance is more than or equal to 10 nm and less than or equal to 100 nm.

6. The secondary battery according to claim 1,
wherein the fibrous substance is contained in the composite electrolyte that is greater than or equal to 0.1 weight % and less than or equal to 99 weight %.

7. The secondary battery according to claim 1,
wherein the inorganic compound particles comprise at least one selected from a group consisting of sulfide-based glass ceramic, an inorganic compound having a perovskite type structure, an inorganic compound having an LiSICON type structure, LATP having an NASICON type skeleton, amorphous LIPON and an inorganic compound having a garnet type structure.

8. The secondary battery according to claim 1, wherein the composite electrolyte comprises gel type composition.

9. A battery pack comprising;
a plurality of secondary battery comprising a positive electrode, a negative electrode arranged opposite to the positive electrode, a composite electrolyte interposed between the positive electrode and the negative electrode, the composite electrolyte comprising an organic electrolyte, at least one of inorganic compound particles and organic compound particles, and a fibrous substance extending from the composite electrolyte to at least one of the positive electrode and the negative electrode through their interface.

10. The battery pack according to claim 9, further comprising:
an external terminal for energization and a protective circuit.

11. The battery pack according to claim 9,
wherein the battery packs are connected electrically to each other in series, in parallel, or in a combination of series connection and parallel connection.

12. A vehicle comprising:
a plurality of secondary battery comprising a positive electrode, a negative electrode, a composite electrolyte interposed between the positive electrode and the negative electrode, the composite electrolyte comprising at least one of inorganic compound particles and organic compound particles, and an organic electrolyte; and a fibrous substance extending from the composite electrolyte to at least one of the positive electrode and the negative electrode through their interface.

13. The vehicle according to claim 12, further comprising:
a regenerative mechanism converting kinetic energy into regenerative energy as electrical energy.

14. A secondary battery comprising:
a positive electrode;
a negative electrode arranged opposite to the positive electrode;
a composite electrolyte interposed between the positive electrode and the negative electrode, the composite electrolyte comprising an organic electrolyte and at least one of inorganic compound particles and organic compound particles; and
a fibrous substance buried in both of the composite electrolyte and at least one of the positive electrode and the negative electrode,
wherein the fibrous substance extends from the composite electrolyte to at least one of the positive electrode and the negative electrode through their interface.

15. A secondary battery comprising:
a positive electrode;
a negative electrode arranged opposite to the positive electrode;
a composite electrolyte interposed between the positive electrode and the negative electrode, the composite electrolyte comprising an organic electrolyte and at least one of inorganic compound particles and organic compound particles; and
a fibrous substance existed in both of the composite electrolyte and at least one of the positive electrode and the negative electrode,
wherein the fibrous substance stretches from the composite electrolyte to at least one of the positive electrode and the negative electrode through their interface.

* * * * *